US010186393B2

(12) United States Patent
Funcheon et al.

(10) Patent No.: US 10,186,393 B2
(45) Date of Patent: Jan. 22, 2019

(54) SURGE PROTECTOR SWITCH DISCONNECT MODULES AND DEVICES

(71) Applicant: EATON INTELLIGENT POWER LIMITED, Dublin (IE)

(72) Inventors: Austin James Funcheon, Ballwin, MO (US); Joseph James Ventura, Eureka, MO (US); You Lu, Shaanxi (CN)

(73) Assignee: EATON INTELLIGENT POWER LIMITED, Dublin (IE)

(*) Notice: Subject to any disclaimer, the term of this patent is extended or adjusted under 35 U.S.C. 154(b) by 350 days.

(21) Appl. No.: 15/155,181

(22) Filed: May 16, 2016

(65) Prior Publication Data

US 2017/0330718 A1 Nov. 16, 2017

(51) Int. Cl.

| | |
|---|---|
| ***H02H 9/00*** | (2006.01) |
| ***H01H 83/10*** | (2006.01) |
| ***H01C 7/12*** | (2006.01) |
| ***H01H 9/22*** | (2006.01) |

(52) U.S. Cl.
CPC ............... *H01H 83/10* (2013.01); *H01C 7/12* (2013.01); *H01H 9/22* (2013.01)

(58) Field of Classification Search
CPC ..................................................... H01H 83/10
See application file for complete search history.

(56) References Cited

U.S. PATENT DOCUMENTS 4,691,978 A * 9/1987 Lemmer .............. H01H 50/443 200/51 R
8,514,538 B2 * 8/2013 Crevenat ............... H01H 83/10 361/103

* cited by examiner

Primary Examiner — Stephen W Jackson
(74) *Attorney, Agent, or Firm* — Armstrong Teasdale LLP

(57) ABSTRACT

Surge protection modules and switch bases separately provided from the surge protection modules facilitate plug-in installation and removal of the surge protection modules as well as disconnect switching capability to facilitate maintenance and service events in an electrical power system without de-energizing circuitry connected to the switch bases.

19 Claims, 24 Drawing Sheets

SURGE PROTECTOR SWITCH DISCONNECT MODULES AND DEVICES

BACKGROUND OF THE INVENTION

The field of the invention relates generally to electrical circuit protection devices, and more specifically to voltage surge protection devices and systems for electrical panelboards.

Various different types of circuit protectors exist to meet the needs of electrical power systems providing electrical power to various loads. Among these, surge suppression devices (SPDs) have been developed in response to the need to protect an ever-expanding number of circuits, and particularly electronic devices connected to those circuits from over-voltage conditions in line-side circuitry that may result, for example, from static discharge or lightning strikes. Over-voltage surges can damage or destroy unprotected consumer electronics or sophisticated electronic packages used in industrial and commercial applications. Indeed, it is not uncommon for electronic devices to include internal SPDs or surge protection features designed to protect the device from certain overvoltage conditions or surges, and also for line-side circuitry powering the electronic device in an electrical power distribution system to include SPDs. Examples of electrical equipment which typically utilize SPD devices include but are not limited to telecommunications system, computer systems and control systems.

In use, SPDs normally exhibit a high impedance, but when an over-voltage event occurs, the devices switch to a low impendence state so as to shunt or divert overvoltage-induced current to electrical ground. Damaging currents are therefore diverted from flowing to load-side circuitry, thereby protecting the corresponding equipment, loads and electronic devices from damage.

When SPDs are utilized in electrical panelboards, certain problems are presented, and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
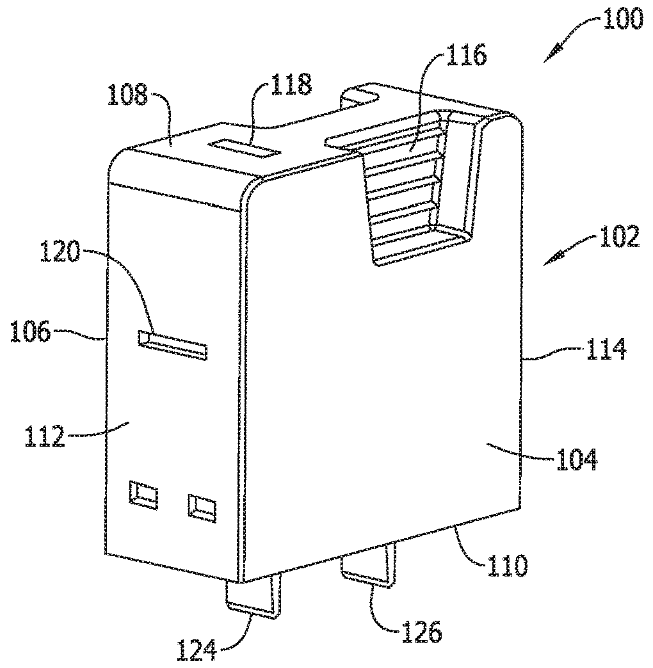
FIG. 1 is a perspective view of an exemplary surge suppression device (SPD) module according to the present invention.

Electrical power systems are subject to voltages within a fairly narrow range under normal operating conditions. However, system disturbances, such as lightning strikes and switching surges, may produce momentary or extended voltage levels that exceed the levels experienced by the circuitry during normal operating conditions. These voltage variations often are referred to as over-voltage conditions. As mentioned previously, surge suppression devices (SPDs) have been developed to protect circuitry against such over-voltage conditions.

Surge suppression devices typically include one or more voltage-dependent, nonlinear resistive elements, referred to as varistors, which may be, for example, metal oxide varistors (MOV's). A varistor is characterized by having a relatively high resistance when exposed to a normal operating voltage, and a much lower resistance when exposed to a larger voltage, such as is associated with over-voltage conditions. The impedance of the current path through the varistor is substantially lower than the impedance of the circuitry being protected when the device is operating in the low-impedance mode, and is otherwise substantially higher than the impedance of the protected circuitry. As over-voltage conditions arise, the varistors switch from the high impedance mode to the low impedance mode and shunt or divert over-voltage-induced current surges away from the protected circuitry and to electrical ground, and as over-voltage conditions subside, the varistors may return to a high impedance mode.

Depending on the magnitude of the over-voltage condition event, the SPDs may be rendered inoperable for further use and accordingly must be replaced. In response to extreme over-voltage events (i.e., very high over-voltage conditions), the varistor(s) in the SPD devices may switch very rapidly to the low impedance mode, and because of exposure to extremely high voltage and current the varistors may degrade rapidly and sometimes fail. Also, if overvoltage conditions are sustained for a period of time, even for low to moderate over-voltage conditions, the varistors (e.g., MOVs) can overheat and fail. If the failure occurs when the MOV is in a conductive state, short circuit conditions and electrical arcing may result.

To address such problems, known surge protection devices (SPDs) have been used in combination with a series connected fuse or circuit breaker. As such, the fuses or circuit breakers can more effectively respond to overcurrent conditions resulting from over-voltage conditions in which, at least for some duration of time, the varistor in the surge suppression device is incapable of completely suppressing over-voltage conditions. In cases wherein the MOV's become partially conductive due to sustained overvoltage conditions, however, the fuse or breaker may not operate if the current flowing through the MOV is below the rating of the fuse or breaker. In such conditions, even relatively small currents flowing through the MOV over a length of time can produce thermal runaway conditions and excessive heat in the MOV that can lead to its failure. Accordingly, some SPDs now include built-in thermal protection features and also may include short circuit protection devices that operate internally to the SPDs to open or disconnect a current path through the SPDs. if they should reach the aforementioned conditions.

While existing SPDs have enjoyed some success in protecting electrical power systems and circuitry from transient over-voltage events, challenges remain in certain applications. Specifically, a number of the scenarios described above present maintenance events for operators of an electrical power system. The SPDs and any connected circuit protectors may need to be accessed, inspected and replaced over time as they respond to over-voltage events. Accessing, inspection, and servicing SPDs for replacement and the like is sometimes challenging in certain installations.

In typical panelboard applications, for example, SPDs may be integrally provided or built-in to the panel structure. Safe service of SPD devices is generally not possible, however, without de-energizing the entire panel first. De-energizing a panel is a disruptive event to the electrical power system and the loads to which power is being supplied. It would accordingly be desirable to provide SPDs that could be serviced without de-energizing the entire panel.

Servicing of SPDs also tends to be long and cumbersome in conventional panelboard installations. Removal of the panel deadfront is typically required, as well as a trained electrician to replace the SPD. More convenient and user-friendly SPD options are desired.

Feed through lugs are often occupied in many panelboards by other circuit elements, therefore complicating the use of an internal SPD altogether. While an SPD can perhaps still be mounted and "racked in" by a set of breakers or fusible switches when feed through lugs are occupied, easier and quicker installation SPDs would be desirable.

Accordingly, exemplary embodiments of SPD devices and SPD switch bases according to the invention are described hereinbelow that advantageously overcome these and other problems in the art. The SPD devices and SPD switch bases according to the invention provide safe and easy service of SPD devices without having to de-energize the entire panel first. The SPD devices and SPD switch bases according to the invention further expedite maintenance by making the SPD modules easy to replace without removing a panel deadfront, as well as provide a convenient option for an internal SPD when feed through lugs are occupied in a panel.

The benefits of the invention are achieved in part with SPD modules and separately provided SPD switch bases that in combination permit plug-in installation and removal of the SPD devices from the SPD switch bases. The SPD base includes a switch mechanism that may disconnect the SPD from an energized panel through the SPD switch base and avoid any need to de-energize the panel to maintain or service the SPDs. The switch bases may easily and conveniently be mounted to the panelboard, and the SPD modules may be inserted and removed by hand and without the use of tools to facilitate quick and convenient maintenance and service. Local and remote state detection features may be provided in the SPD modules to minimize inspection efforts for SPDs. Method aspects will be in part specifically discussed and in part apparent from the following description.

Referring now to FIG. 1 an exemplary surge suppression device (SPD) module 100 according to the present invention is shown. The SPD module is shown diagrammatically in FIG. 2 in use in an electrical power system.

The SPD module 100 includes a generally rectangular, box-like housing 102. Accordingly, the housing 102 in the example shown includes opposing main faces or sides 104 and 106, upper and lower faces or sides 108 and 110, interconnecting adjoining edges of the sides 104 and 106, and lateral sides 112 and 114 interconnecting adjoining edges of the sides 104 and 106 and adjoining edges of the upper and lower sides 108, 110. The sides 104, 106, 108, 110, 112 and 114 in the example shown are generally flat and planar, and extend generally parallel with the respective opposing sides to form a generally orthogonal housing 102. The shape and relative proportions of the sides of the housing shown are exemplary only. Various other geometric shapes of the housing 102 are likewise possible and may be utilized to cover, enclose and/or protect the internal components of the module 100.

In the illustrated embodiment, the housing 102 is also formed with a reduced width finger grip 116 proximate the upper side 108 and portions of the sides 104, 106. As such, the finger grip 116 may be grasped with a person's thumb and forefinger, for example, to handle the SPD module 100 for removal or installation as described below. The finger grip 116 is exemplary only, and other shapes and geometries of finger grips may alternatively be utilized. In some embodiments, the finger grip 116 may be considered optional and may be omitted. Other finger grip features may also be incorporated into the housing 102 on the side walls 112, 114 in a similar manner to the module shown in FIG. 15 to facilitate a person's ability to grasp the housing by hand on non-slip engagement surfaces.

The upper side 108 of the housing 102 is formed with a generally elongated opening 118 through which a portion of a local state indication element 119 (FIG. 2) may project to visually indicate a change in state of the module 100. The local state indication element may in one example be a portion of a thermal disconnect element that is released within the device in response to low over-voltage conditions sustained for a predetermined amount of time. Alternative state indicators are known, however, that are responsive to other elements inside the housing 102, any of which may be utilized. In normal conditions, the local state indication element 119 is maintained inside the module housing 102 and is not visible from the outside, whereas in response to an over-voltage event the local state indication element 119 is caused to partly project from the module housing 102 through the aperture 118. Therefore, one can see from visual inspection of the module 100 whether or not an over-voltage event has occurred that may require replacement of the module 100.

The lateral side 112 of the module housing 102 also includes an elongated aperture 120 that cooperates with an interlock element described below to ensure safe installation or removal of the module 100 from a switch base.

The housing 102 may be formed from an insulating or electrically nonconductive material such as plastic, according to known techniques such as molding. Other nonconductive materials and techniques are possible, however, to fabricate the housing 102 in further and/or alternative embodiments. Additionally, the housing 102 may be formed and assembled from two or more pieces collectively defining an enclosure for the internal components of the module 100.

Blade terminals 124 and 126 extend from the lower side 110 of the housing 102 in the embodiment shown. The blade terminals 124 and 126 are generally planer conductive elements that extend in spaced apart, but generally parallel planes. Each blade terminal 124, 126 further extends transversely to the longitudinal sides 104, 106 of the housing 102 and parallel to the lateral sides 112, 114. Other arrangements of the terminals blades are possible in other embodiments, such as blade terminal extending transversely to the lateral sides 112, 114 of the housing 102 and parallel to the longitudinal sides 104, 106.

Figure 2:
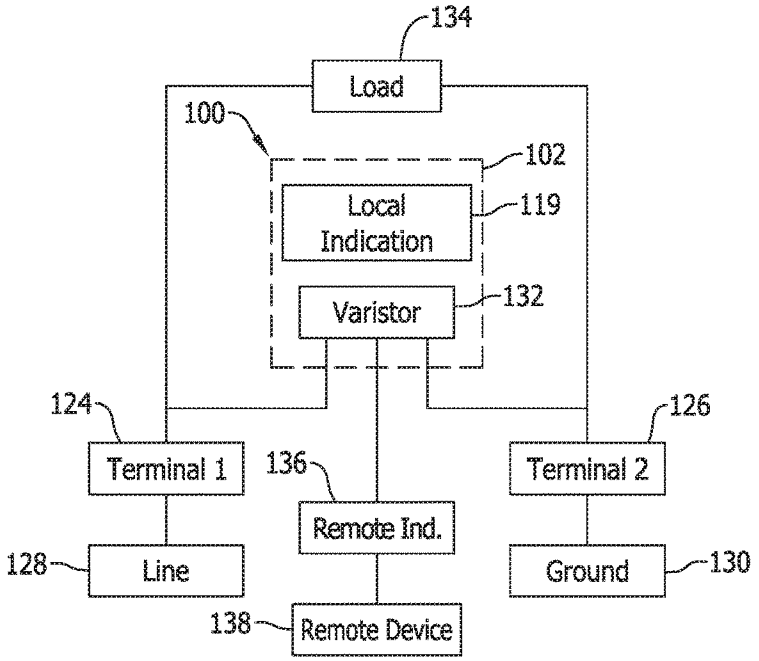
FIG. 2 is a block diagram of the SPD module shown in FIG. 1.

As shown in FIG. 2, the blade terminals 124 and 126 may respectively connect with a power line or line side circuitry 128 and a ground line, ground plane or neutral line designated at 130, with plug-in connection to switch base. At least one varistor element 132 is inside the module housing 102 and is connected between the terminals 124 and 126. The varistor element 132 provides a low impedance path to ground in the event of an over-voltage condition in the power line 128. The low impedance path to ground effectively directs otherwise potentially damaging current away from and around downstream circuitry connected to the power line or line-side circuitry 128. The downstream circuitry, referred to as the load-side circuitry 134, is connected in electrical parallel with the SPD module 100.

In normal operating conditions when an over-voltage condition is not present, the varistor 132 provides a high impedance path through the module 100 such that the varistor 132 effectively draws insignificant current and does not affect the voltage of the power line 128 such that power may be delivered to the load-side circuitry 134. The varistor 132 may switch between the high and low impedance modes to regulate the voltage on the line-side circuit 128, either standing alone or in combination with other devices. Optionally, thermal protection features and/or short circuit protection features may also be provided in the module 100 in a known manner. Alternatively, other circuit protection devices such as circuit breakers and/or fuses may be separately provided and connected in series with the module 100 to respond to low over-voltage events and/or short circuit events.

The module 100 may also include a remote indication element 136 that may facilitate communication with a remote device 138 as described in exemplary form below. Remote change of state indication may therefore be provided via the remote indication element 136 at any desired location for responsible personnel tasked with overseeing and maintaining the electrical power system.

Figure 3:
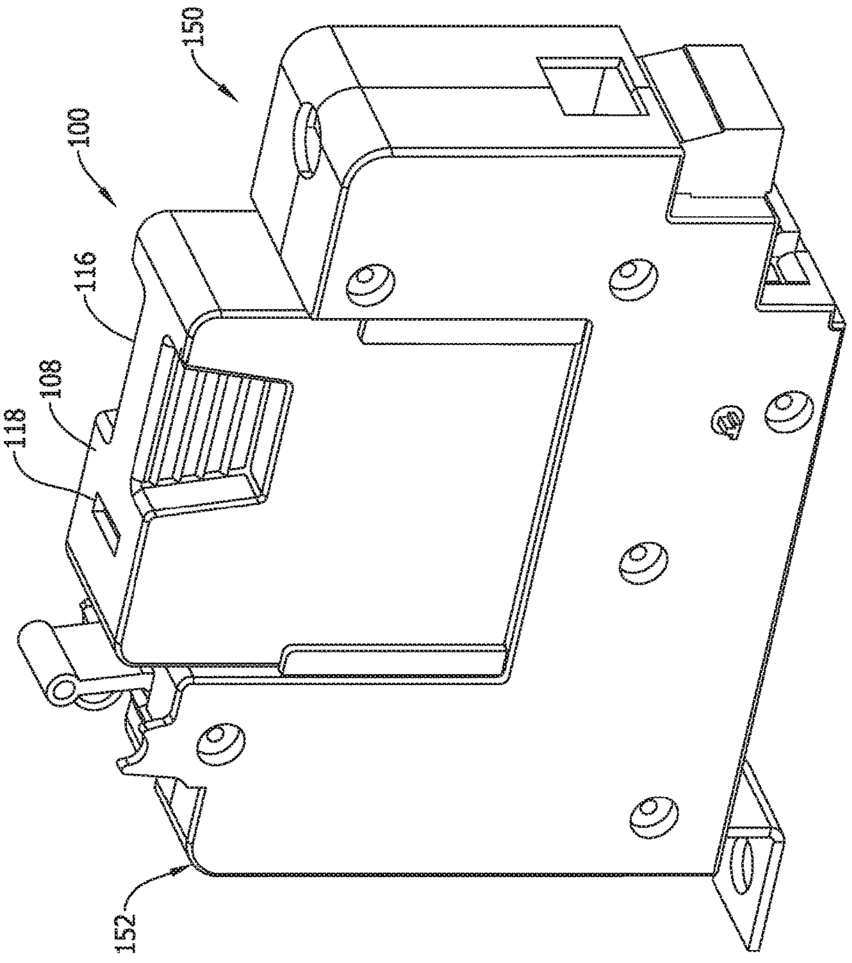
FIG. 3 is a perspective view of the SPD module shown in FIG. 1 inserted into a panel mount SPD switch base.
Figure 4:
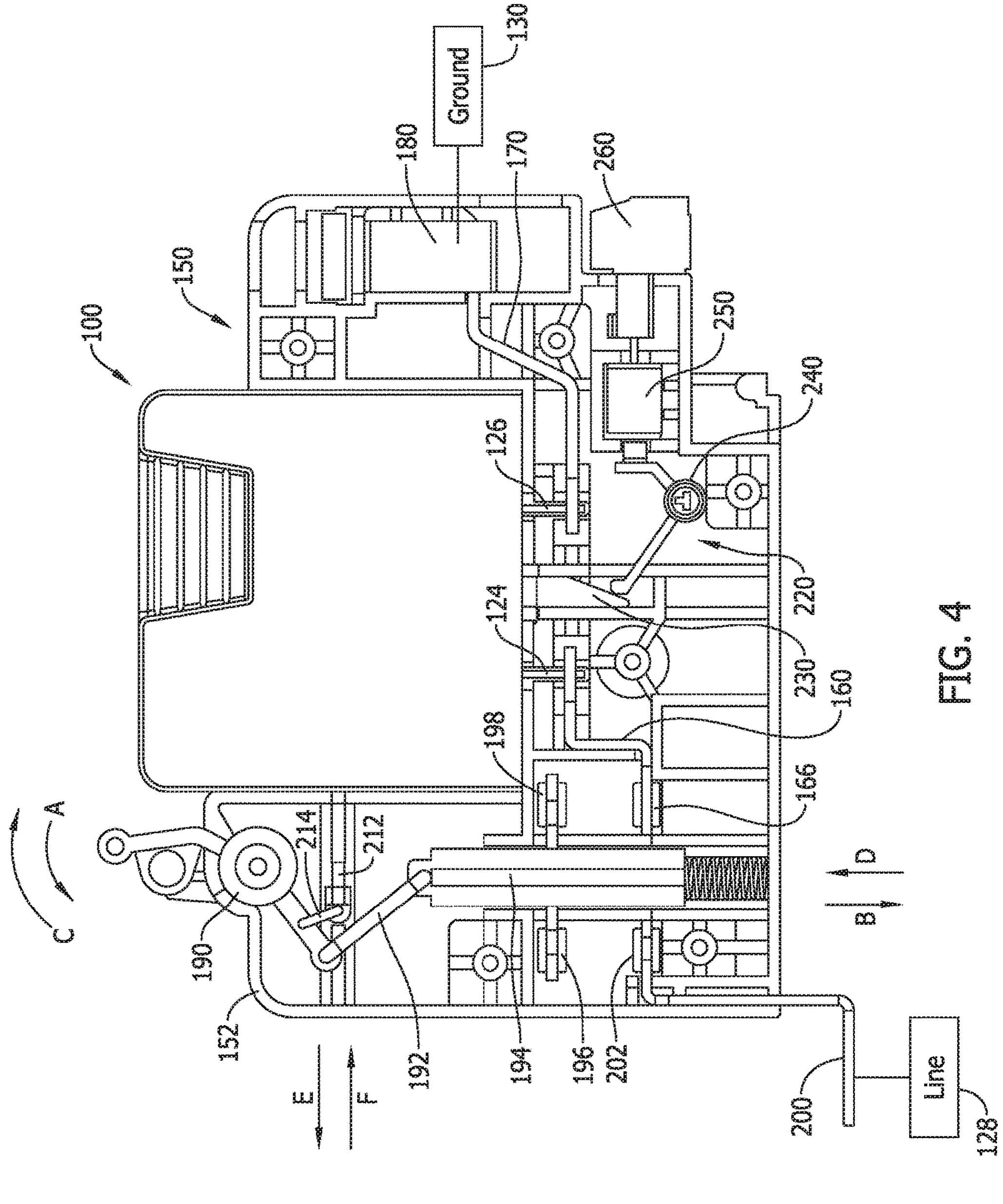
FIG. 4 is a side elevational view of the SPD module and switch base shown in FIG. 3 and revealing the internal construction of the SPD switch base.
Figure 5:
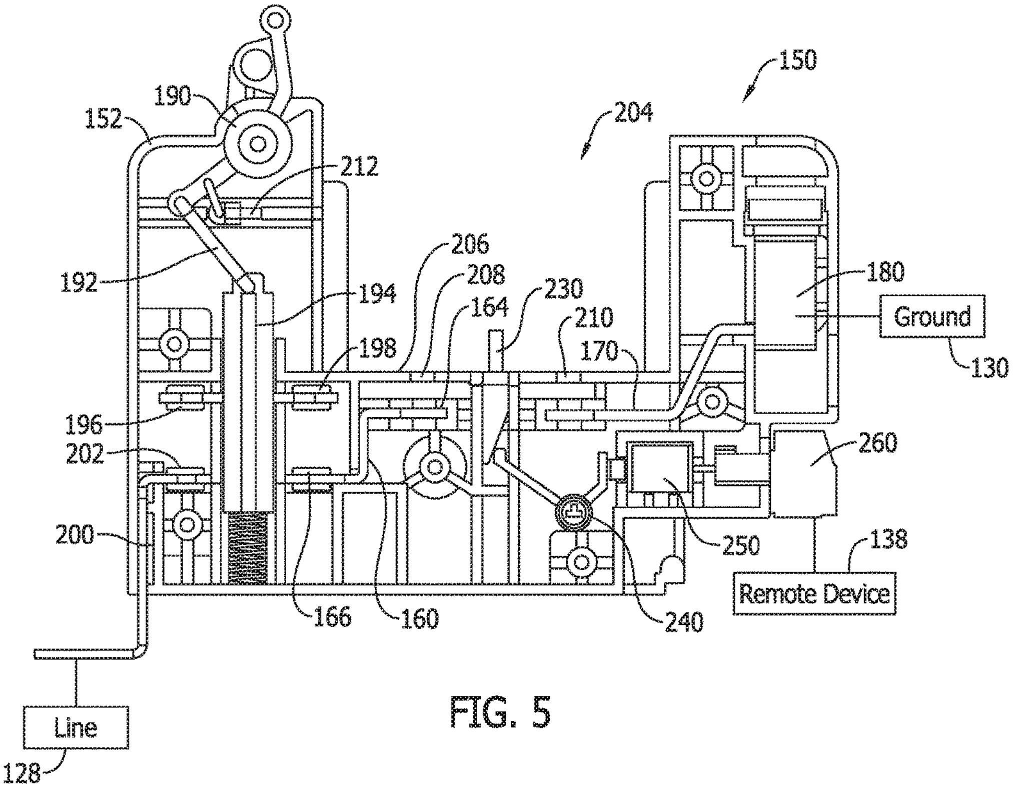
FIG. 5 is a side elevational the SPD switch base with the SPD module removed.
Figure 6:
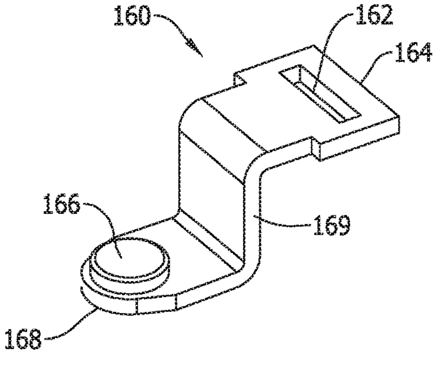
FIG. 6 is a perspective view of a first exemplary terminal member for the SPD switch base shown in FIG. 5.
Figure 7:
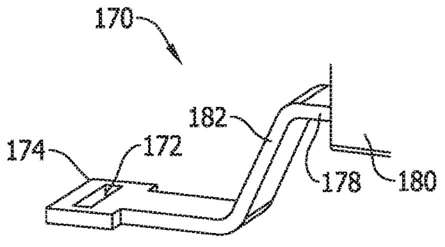
FIG. 7 is a perspective view of a second exemplary terminal member for the SPD switch base shown in FIG. 5.

FIG. 3 is a perspective view of the SPD module 100 inserted into an SPD switch base 150. FIG. 4 is a side elevational view of the SPD module 100 and switch base 150 revealing the internal construction of the SPD switch base 150. FIG. 5 is a side elevational the SPD switch base 150 with the SPD module 100 removed. FIGS. 6 and 7 illustrate terminal members of the SPD switch base 150. The SPD switch base 150 includes a non-conductive switch housing 152 configured or adapted to receive the SPD module 100 and connect or disconnect the line side circuitry 128 to and from the module 100 through the switch base 150.

A line-side module terminal member 160 (shown separately in FIG. 6) may be situated within the switch housing 152 and may receive one of the terminal blades 124 (FIG. 4) of the SPD module 100 through an aperture or opening 162 on one end 164 thereof. The line-side terminal member 160 may also include a switch contact 166 on its other end 168. The ends 164, 168 of the line-side terminal member 160 are generally flat and planar and extend in spaced apart relationship in a generally parallel orientation to one another. In between the ends 164, 168 extends an interconnecting perpendicular section 169 such that the end 164 including the aperture 162 is generally elevated relative to the end 168 including the contact 166. The line-side terminal member 160 is mounted in a stationary manner in the switch housing 152, and because of this the switch contact 166 is referred to herein as a stationary contact in the switch housing 152.

A ground-side module terminal 170 (shown separately in FIG. 7) may also be situated within the switch housing 152 and may receive the other terminal blade 126 of the module 100 through an aperture or opening 172 on one end 174 thereof. The ground-side terminal 170 may be electrically connected to a ground-side terminal 180 on its other end 178. In between the ends 174, 178 extends an oblique section 182 such that the end 178 attached to the ground-side terminal 180 is generally elevated relative to the end 174 including the opening 172.

A rotary switch actuator 190 is further provided on the switch housing 152, and is mechanically coupled to an actuator link 192 that, in turn is coupled to a sliding actuator bar 194. The actuator bar 194 carries a pair of switch contacts 196 and 198. A line-side terminal 200 including a stationary contact 202 is also provided. Electrical connection to power supply or line-side circuitry 128 may be accomplished in a known manner using the line-side terminal 200, and an electrical connection to ground or neutral 130 may be accomplished in a known manner using the ground-side terminal 180.

A variety of connecting techniques are known (e.g., box lug terminals, screw clamp terminals, spring terminals, and the like) and may be utilized. The configuration of the line and ground-side terminals 200 and 180 shown are exemplary only, and in the example shown the line and ground-side terminals 200 and 180 are differently configured. In the embodiment illustrated, the line-side terminal 200 is configured as a panel mount clip while the ground-side terminal 180 is configured as a box lug terminal. In alternative embodiments, however, the ground-side terminal 180 and line-side terminal 200 instead of being different types of terminals may be configured to be the same (e.g., both may be configured as box lug terminals or as another terminal configuration as desired).

Connection switching may be accomplished by rotating the switch actuator 190 in the direction of arrow A (FIG. 4), causing the actuator link 192 to move the sliding bar 194 linearly in the direction of arrow B and moving the switch contacts 196 and 198 toward the stationary contacts 202 and 166 along a linear axis or linear path of motion. Eventually, the switch contacts 196 and 198 become mechanically and electrically engaged to the stationary contacts 202 and 166 and a circuit path may be closed through the module 100 between the terminals 200 and 180 when the terminal blades 124 and 126 are received in the line and ground-side terminals 160 and 170. This position, wherein the movable switch contacts 196 and 198 are mechanically and electrically connected to the stationary switch contacts 202 and 166 is referred to herein as a closed or connected position wherein the SPD switch base 150 electrically connects the line-side circuitry 128 and the ground-side circuitry 130 through the SPD module 100.

When the actuator 190 is moved in the opposite direction indicated by arrow C in FIG. 4, the actuator link 192 causes the sliding bar 194 to move linearly in the direction of arrow D and pull the switch contacts 196 and 198 away from the stationary contacts 202 and 166 along a linear path of motion to open the circuit path through the SPD module 100. This position wherein the movable switch contacts 196 and 198 are mechanically and electrically separated from the stationary switch contacts 202 and 166 is referred to herein as an opened or disconnected position wherein the SPD switch base 150 electrically disconnects the line-side circuitry 128 and the ground-side circuitry 130.

As such, by moving the actuator 190 to a desired position to effect the opened or closed position of the switch contacts, the SPD module 100 and associated ground-side circuitry 130 may be connected and disconnected from the line-side circuitry 128 while the line-side circuitry 128 remains "live" in full power operation.

Additionally, the SPD module 100 may be simply plugged into the module terminals 160, 170 or extracted therefrom to install or remove the SPD module 100 from the switch housing 152. The module housing 102 projects from the switch housing 152 and is open and accessible so that a person can grasp the module housing 102 by hand and pull it in the direction of arrow D to disengage the module terminal blades 124, 126 from the line and ground-side terminals 160 and 170 such that the SPD module 100 is completely released from the switch housing 152. Likewise, a replacement SPD module 100 can be grasped by hand and moved toward the switch housing 152 to engage the module terminal blades 124, 126 to the line and ground-side terminals 160 and 170.

Such plug-in connection and removal of the SPD module 100 advantageously facilitates quick and convenient installation and removal of SPD module 100 without requiring tools or fasteners common to other known switch or disconnect devices. Also, the module terminal blades 124, 126 project from the lower side 110 of the module housing 102 that faces the switch housing 152. Moreover, the module terminal blades 124, 126 extend in a generally parallel manner projecting away from the lower side 110 of the SPD module 100 such that the module housing 100 (as well as a person's hand when handling it) is physically isolated from the conductive module terminal blades 124, 126 and the conductive line and ground-side terminals 160 and 170. The SPD module 100 is therefore touch safe (i.e., may be safely handled by hand without risk of electrical shock) when installing and removing the module 100. Additionally, the switch base 150 is rather compact and does not occupy an undue amount of space in a panelboard.

By disconnecting the module 100 with the switch actuator 190 before installing or removing the SPD module 100, any risk posed by electrical arcing or energized metal at the module and housing interface is eliminated. As shown in FIG. 5, the switch housing 152 in one example includes an open ended receptacle or cavity 204 that accepts a portion of the module housing 102 when the SPD module 100 is installed with the module terminal blades 124, 126 engaged to the terminals 160, 170. When the SPD module 100 is installed, a portion of the module housing 102 projects from the receptacle 204 and is conveniently accessible to a person to grasp the module housing 102 with his or her hand. It is understood, however, that in other embodiments the module housing need not project as greatly from the switch housing receptacle when installed, and indeed could even be substantially entirely contained with the switch housing 152 if desired.

As best shown in FIG. 5, the switch housing receptacle 204 further includes a bottom surface 206, sometimes referred to as a floor, that includes first and second openings 208, 210 formed therein and through which the module terminal blades 124, 126 may be extended to engage them with the line and ground-side terminals 160 and 170. In contemplated embodiments, the lower side 110 of the module housing 102 may include a rejection feature such as a projection, and the bottom surface 206 of the receptacle 204 may include a mating feature such as a recess, or vice-versa. The projections and recesses may be arranged such that only compatible SPD modules 100 and switch bases 152 may be successfully mated. Incompatible SPD modules 100 may not be installed, and user error in selecting the proper SPD module 100 may be avoided. Rejection features may be incorporated into the lateral sides of the module housing 102 and/or or elsewhere in the receptacle 204 as desired. Specifically, considering a family of modules 100 that are constructed to have different voltage ratings, the rejection feature(s) on the switch base 150 and/or the module 100 ensure that a module 100 having the proper voltage rating for may installed in a switch base 150, while other modules 100 in the family but having incompatible voltage ratings may not be installed. As one example, a 320V base should not accept a 150V module.

Figure 13:
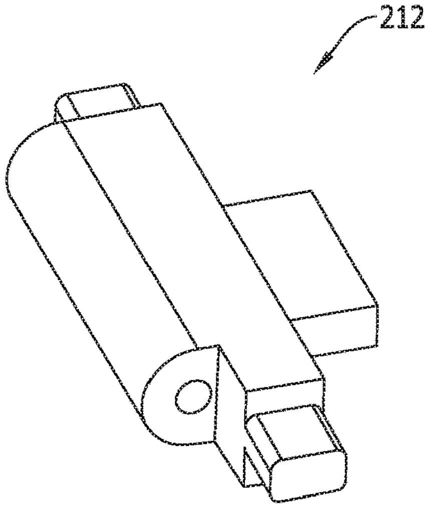
FIG. 13 is a perspective view of a switch interlock element for the SPD switch base shown in FIG. 5.

In the example shown, the assembly further includes an interlock element 212 (shown separately in FIG. 13) that is in turn coupled to the switch actuator 190 via a positioning arm or link 214. As the switch actuator 190 is rotated in the direction of arrow C (FIG. 4) to open the switch contacts 196 and 198, the link 214 pulls the interlock element 212 along a linear axis in the direction of arrow E away from the module housing 102, and more specifically the lateral side 112 (FIG. 1) of the module housing 102. In this state, the slidable plug-in connection of the SPD module 100 and specifically the module terminal blades 124, 126 to the terminals 160, 170, as well as removal of the module terminal blades 124, 126 from terminals 160, 170, is possible.

Figure 14:
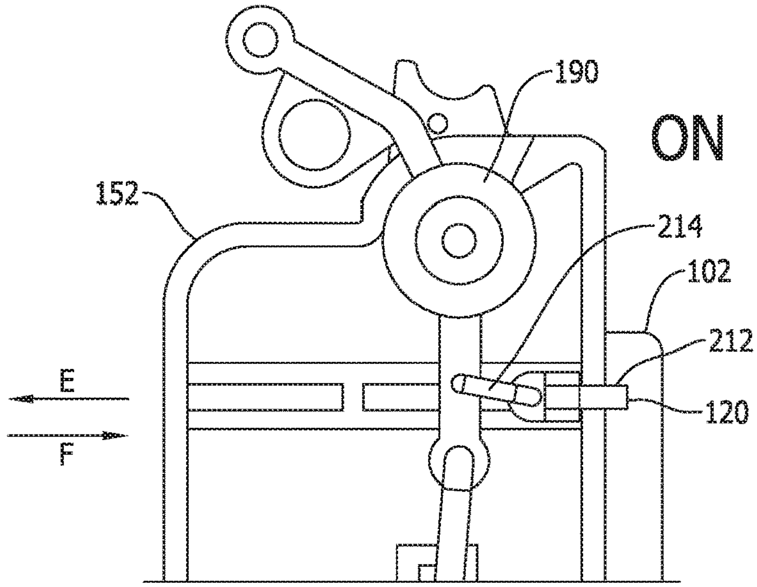
FIG. 14 is a partial view of the SPD switch base shown in FIG. 5 with the switch actuator and the interlock element shown in FIG. 13 in an ON position.

When the switch actuator 190 is rotated in the direction of arrow A, however, to the closed or "on" position wherein the switch contacts 196 and 198 are engaged with the stationary contacts 202 and 166, the interlock element 212 is slidably moved toward the module housing 102 along the linear axis in the direction of arrow F toward the lateral side 112 of the module housing 102. An end of the interlock element is passed through the opening 120 in the lateral side 112 of the module housing 102 as best seen in the magnified partial view of FIG. 14. As this happens and the SPD module 100 becomes effectively locked in place and frustrates any reasonable attempt to remove the SPD module.

The switch actuator 190 simultaneously drives the sliding bar 194 along a first linear axis (i.e., a vertical axis in FIG. 4 as drawn) in the direction of arrow B or D and the slidable interlock element 212 along a second linear axis (i.e., a horizontal axis per FIGS. 4 and 14 as drawn) in the direction of arrows E or F. Specifically, as the sliding bar 194 is moved in the direction of arrow B, the interlock element 212 is driven in the direction of arrow F to lock the module 100 in place. Likewise, when the sliding bar 194 is moved in the direction of arrow D, the interlock element 212 is driven in the direction of arrow E away from the module 100. The mutually perpendicular axes for the sliding bar 194 and the interlock element 212 are beneficial in that that the actuator 190 is stable in either the opened "off" position or the closed "on" position and a compact size of the switch base 150 is maintained. It is understood, however, that such mutually perpendicular axes of motion are not necessarily required for the sliding bar 194 and the interlock element 212. Other axes of movement are possible and may be adopted in alternative embodiments. On this note too, linear sliding movement is not necessarily required for these elements to function, and other types of movement (e.g., rotary or pivoting movement) may be utilized for these elements if desired.

Figure 8:
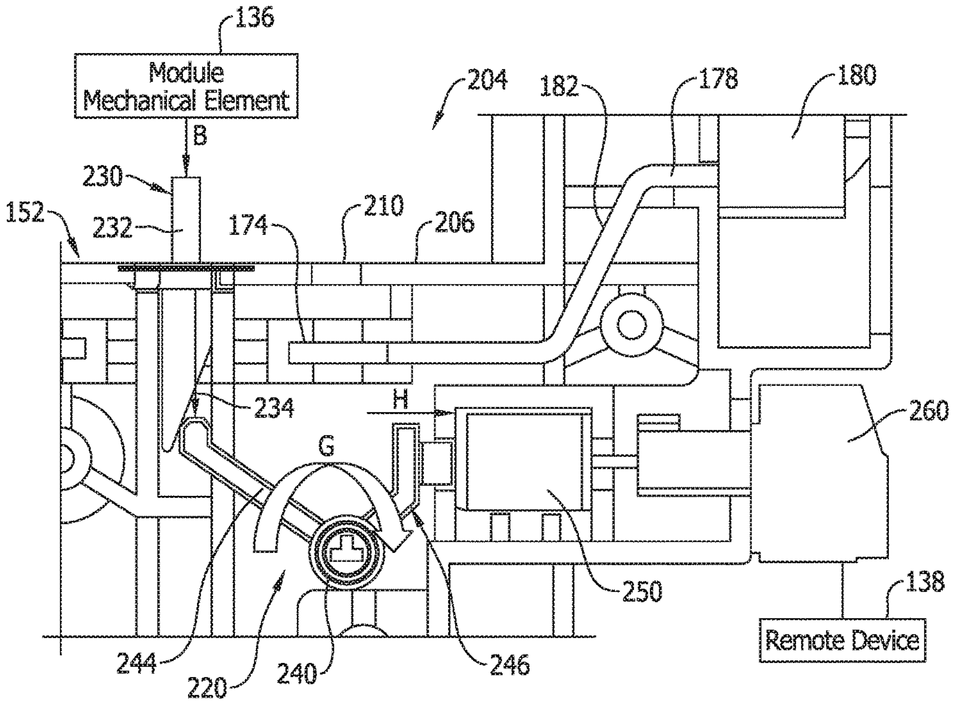
FIG. 8 is a magnified view of a portion of the SPD switch base shown in FIG. 5 and illustrating a remote indication assembly for the SPD module shown in FIG. 1.
Figure 9:
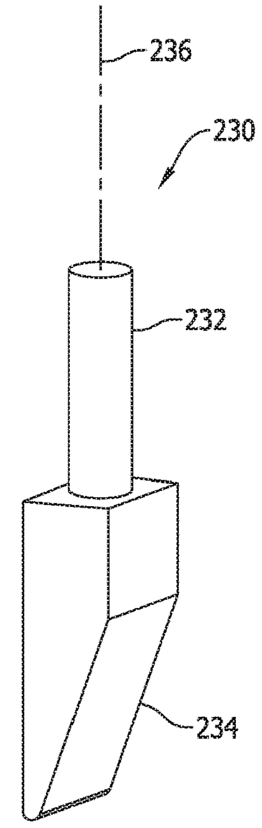
FIG. 9 is a perspective view of a linear actuator element for the remote indication assembly shown in FIG. 8.
Figure 10:
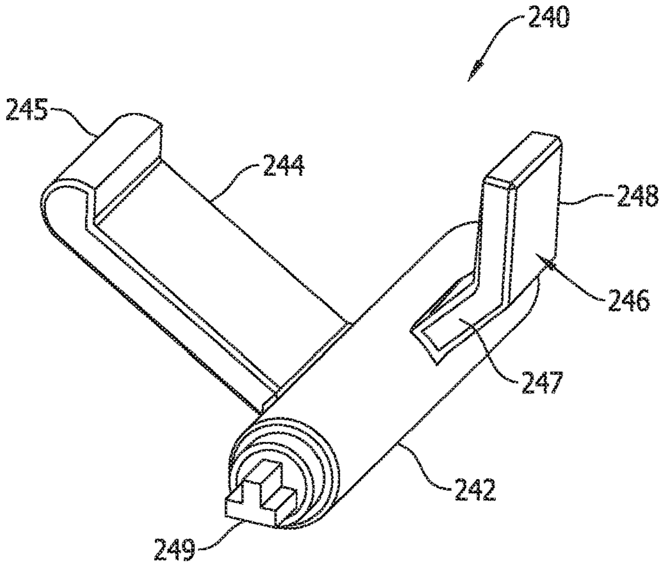
FIG. 10 is a perspective view of a rotational actuator element for the remote indication assembly shown in FIG. 8.
Figure 11:
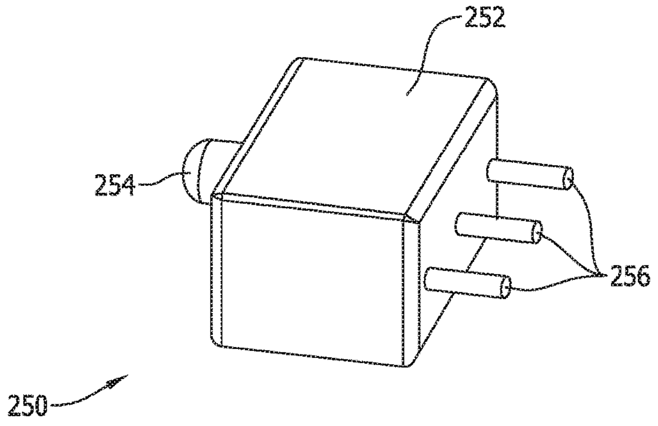
FIG. 11 is a perspective view of an exemplary micro-switch for the remote indication assembly shown in FIG. 8.
Figure 12:
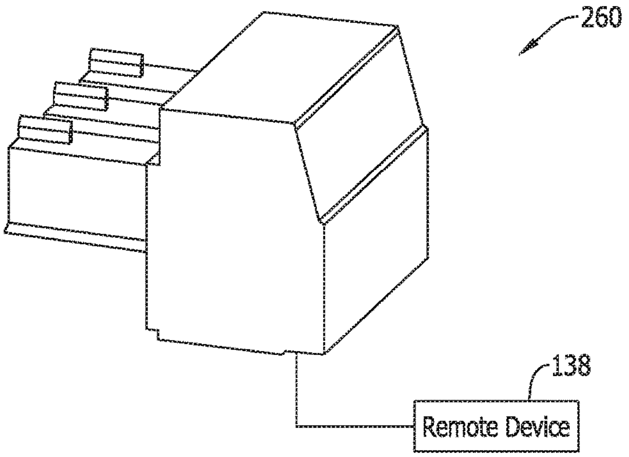
FIG. 12 is a perspective view of a connector element for the remote indication assembly shown in FIG. 8.

FIG. 8 is a magnified view of a portion of the SPD switch base shown in FIG. 5 and illustrating a remote indication assembly 220 for the SPD module shown in FIG. 1. The remote indication assembly 220 includes a linear actuator element 230 (shown separately in FIG. 9) that engages the SPD module 100, a rotational actuator element 240 (shown separately in FIG. 10), a micro-switch 250 (shown separately in FIG. 11), and a connector element 260 for communicating with the remote device 138 (FIGS. 2, 5, and 8).

The linear actuator element 230 includes a cylindrical shaft 232 and a wedge shaped end 234 having an engagement surface extending obliquely to the longitudinal axis 236 of the shaft 232. The shaft 232 extends upwardly from the receptacle floor 206 of the switch base housing 152 and is received in an opening in the lower side 110 of the SPD module 100. The remote indication element 136 (FIG. 1) engages the end of the shaft 232 inside the module housing 102, and when the remote indication element 136 is mechanically released in an over-voltage condition, it depresses the linear actuator element 230 downwardly in the direction of arrow B along a linear path of motion.

The rotational actuator element 240 includes a cylindrical body 242 that may be rotatably mounted in the switch base housing 152 at a distance from the linear actuator element 230, and a first arm 244 extends obliquely from the cylindrical body 242 and includes an enlarged engagement surface 245 in contact with the engagement surface of the wedge shaped end 234 of the linear actuator element 230. The downward displacement of the linear actuator element 230 in the direction of arrow B causes the engagement surface 245 of the rotational actuator element 240 to deflect upon the engagement surface of the wedge shaped end 234 of the linear actuator element 230 and in turn causes the cylindrical body 242 to rotate in the direction of arrow G. In another embodiment, such as the one shown in FIG. 18, the linear actuator may be displaced upwardly in the direction of arrow with an essentially reverse operation of the rotational actuator element 240.

A second arm 246 depends obliquely from the cylindrical body 242 of the rotational actuator element 240. The second arm 246 includes a first angled section 247 and a second angled section 248 depending from the first section 247. The second section 248 transfers the rotation of the cylindrical body 242 and the first section 247 into a generally linear direction where it meets the micro-switch 250 and produces an actuating force in the direction of arrow H (i.e., to the right in FIG. 8). The arms 244 and 246 are in the example shown longitudinally offset from one another along the axis of the cylindrical body 242. The cylindrical body 242 also includes a keyed end that may be connected with another rotational actuator in an adjacent switch base in use.

The micro-switch 250 includes a body 252, a push button or plunger 254 on one side of the body 252, and electrical pins 256 protruding from a side of the body 252 opposing the switch. Depressing of the push button or plunger 254 by the arm 246 of the rotational actuator element 240 closes the micro-switch and causes a signal output on one of the connector pins 256.

The electrical connector 260 receives the connector pins 256 of the micro-switch on end and is configured for connection to the remote device 138 using a connecting wire, for example. When output signals from the micro-switch are received at the remote device 138, alerts and notifications can be sent to persons or other systems or controls in the electrical power system of an over-voltage event so that appropriate actions can be taken.

The assembly 220 accordingly utilizes the rotational element 240 that converts linear motion of the linear actuator 230 along a first axis (e.g., a vertical axis in FIG. 8) to a linear actuation force alone a second axis (e.g., a horizontal axis) that is perpendicular to the first axis. A relatively compact, space saving arrangement is realized. The remote indication assembly 220 and the elements described are exemplary only. Variations of the components in the assembly described are possible in further and/or alternative embodiments.

Figure 15:
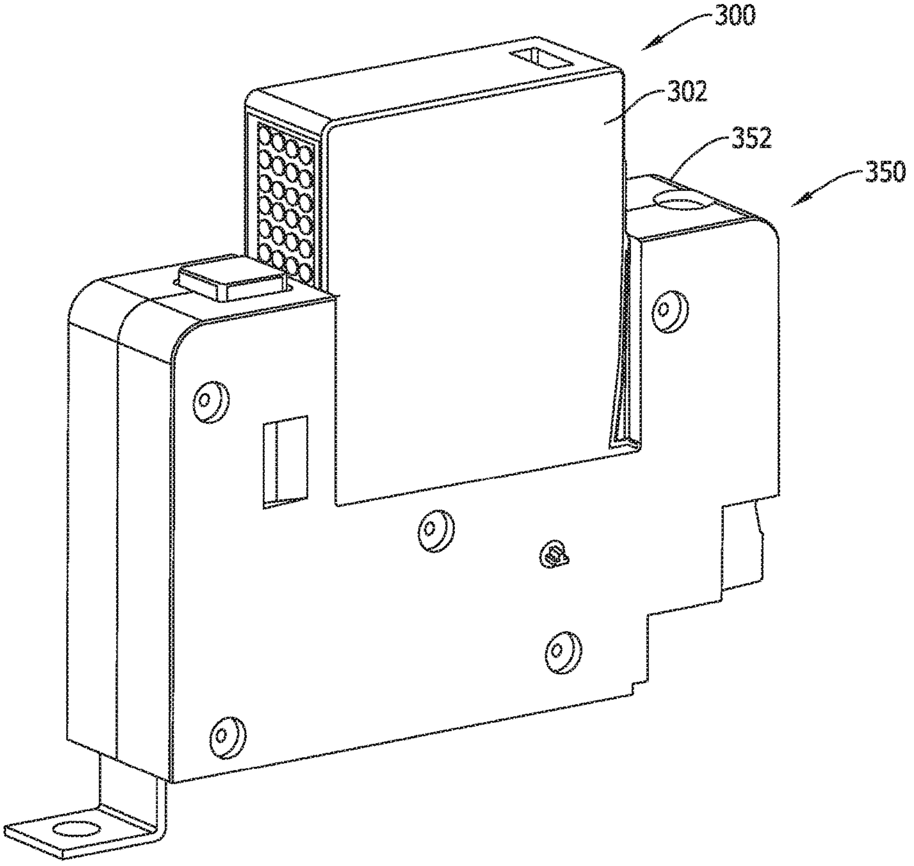
FIG. 15 is a perspective view of another embodiment of an SPD module inserted into another embodiment of a panel mount SPD switch base.

FIG. 15 is a perspective view of another embodiment of an SPD module 300 inserted into another embodiment of a panel mount SPD switch base 350. The SPD module 300, by comparison to the module 100 described above, includes another housing 302 and different terminal structure but is otherwise similar in function. The SPD module 300 can be installed to and removed from the housing 352 of the switch base 350 with plug-in connection and release with similar benefits.

Figure 16:
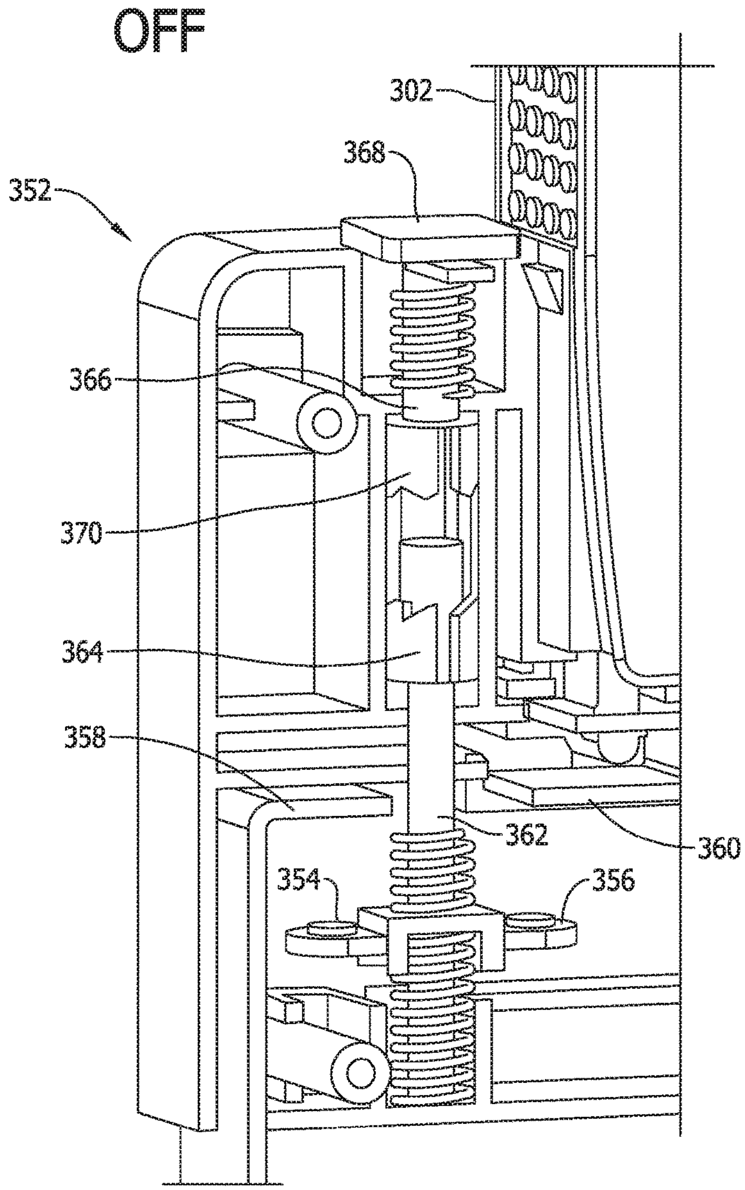
FIG. 16 is a partial perspective view of the SPD switch base shown in FIG. 15 and illustrating its internal switch mechanism in an OFF position.
Figure 17:
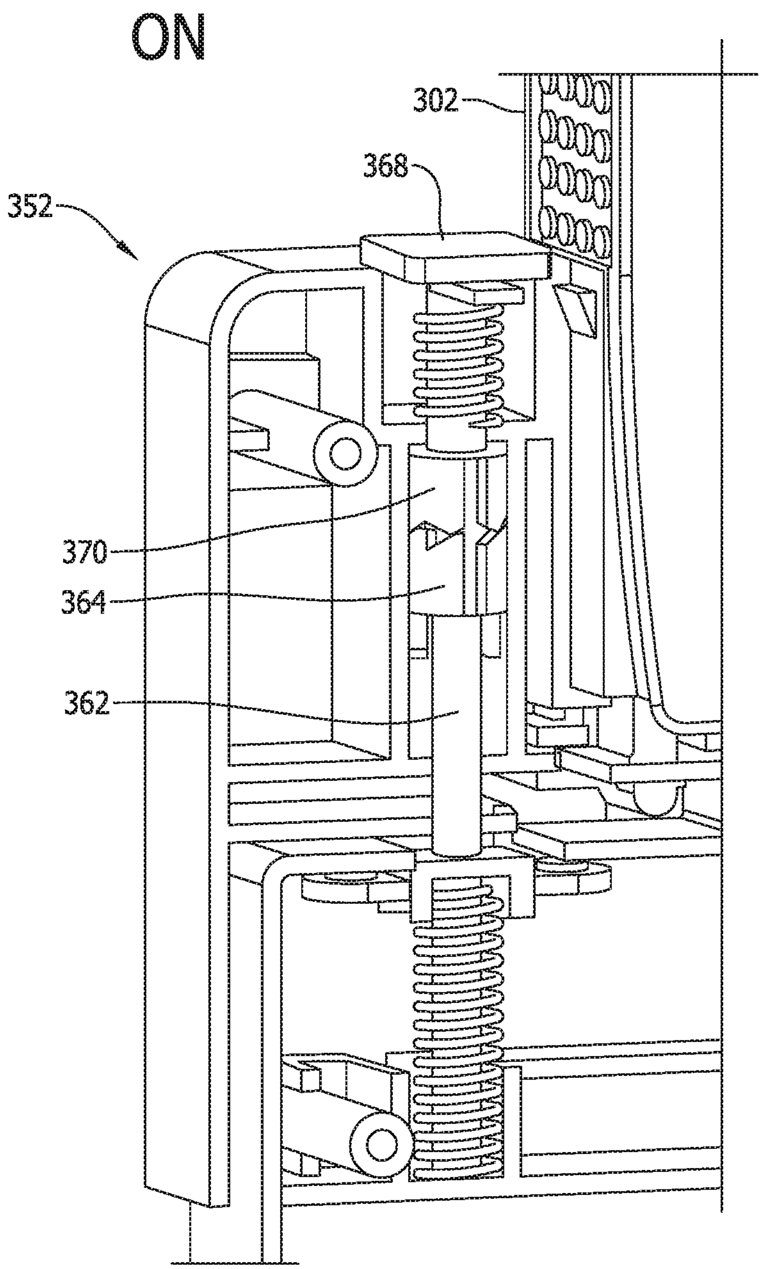
FIG. 17 is a partial perspective view of the SPD switch base shown in FIG. 15 and illustrating its internal switch mechanism in an ON position.

As seen in FIGS. 16 and 17, the SPD switch base 350 includes a different switch mechanism than the switch base 150 described above. The switch mechanism includes dual switch contacts 354, 356 that are moved upwardly toward terminal elements 358, 360 from an opened or OFF position (FIG. 16) to a closed or ON position (FIG. 17) and connect or disconnect the SPD module 300 from the ground circuitry 130 like the switch base 150.

In the arrangement shown in FIG. 16, a lower actuator shaft 362 is biased by a spring in an upward direction, and a sleeve 364 on an end of the lower actuator shelf abuts ribs in the housing 352 such that the contacts 354, 356 are held and maintained in the spaced apart position from the terminal elements 358, 360 as shown in FIG. 16. This position is sometimes referred to as a "primed" position of the mechanism.

An upper actuator shaft 366 is biased by a second spring in an upward direction as well, and a push button 368 extends from the distal end of the upper actuator shaft 366 and is exposed on an upper surface of the switch housing 352. A sleeve 370 extends on the opposing end of the upper actuator shaft 366 and faces the sleeve 364 of the lower actuator shaft 362. In the OFF positions shown in FIG. 16, the sleeve 370 on the upper actuator shaft 366 is spaced apart from the sleeve 364 on the lower actuator shaft 362.

To switch the mechanism to the ON position shown in FIG. 17, the button 368 is depressed downwardly, causing the sleeve 370 on the upper actuator shaft 366 to descend downwardly toward and eventually engage the sleeve 364 on the lower actuator shaft 362. Each sleeve 370, 364 includes an undulating, angled engagement surface that when the sleeves are brought into contact, the lower shaft is caused to rotate about its longitudinal axis until the lower sleeve 364 becomes released from the housing ribs. Once so released, and also when the user releases the button 368 the lower shaft 362 may ascend and carry the contacts 354, 356 upward until engaged with the terminal elements 358, 360.

If the button 368 is again depressed with the mechanism in the ON position shown in FIG. 17, the lower shaft and sleeve 364 may be depressed until the sleeve 364 engages the ribs in the housing once again. The lower shaft 362 and the sleeve 364 will then stay in place while the upper shaft 366 and the button 368 will return to its original position.

Figure 18:
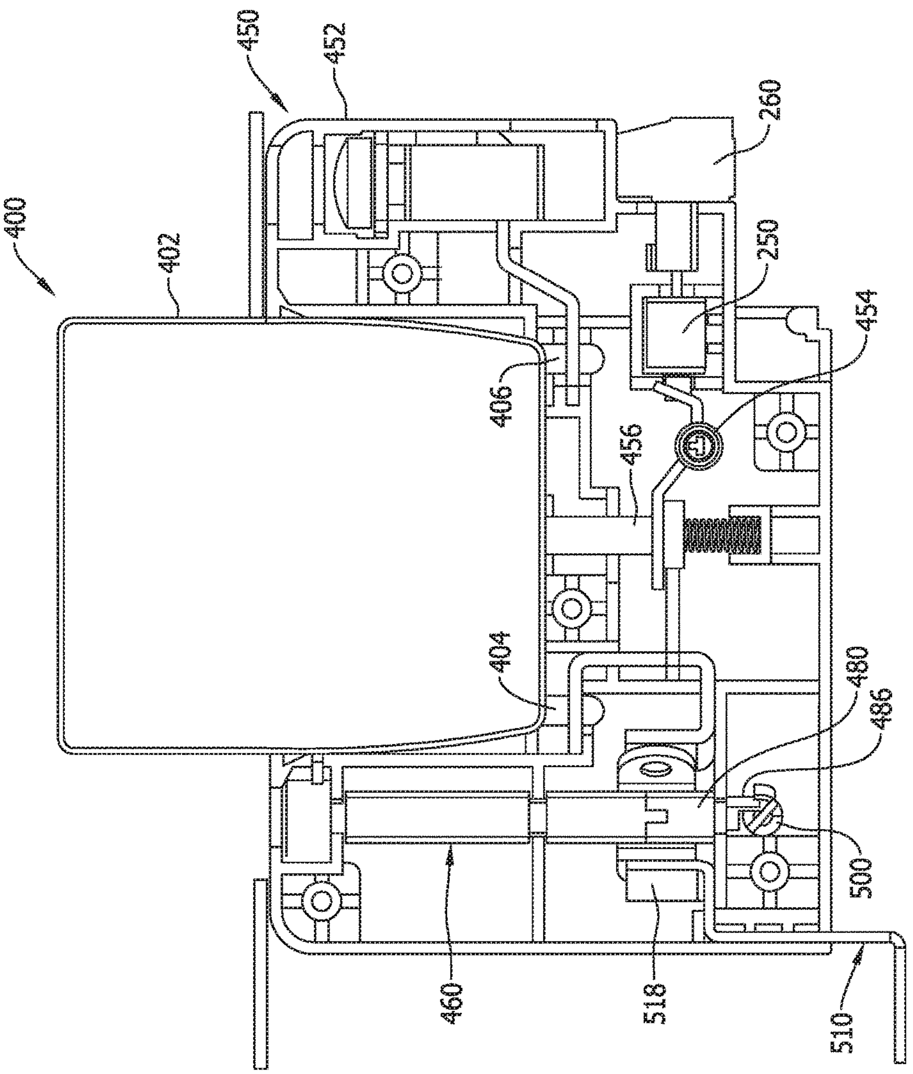
FIG. 18 is a perspective view of another embodiment of an SPD module inserted into another embodiment of a panel mount SPD switch base having another exemplary switch mechanism.

FIG. 18 is a perspective view of another embodiment of an SPD module 400 inserted into another embodiment of a panel mount SPD switch base 450. The SPD module 400, by comparison to the module 100 described above, includes another housing 402 and different terminal structure but is otherwise similar in function. As seen in FIG. 18, the module 400 includes a housing 402 and blade terminals 404, 406 depending from the lower side of the module housing 402. Compared to the terminal blades 124, 126 of the module 100 the terminal blades 404, 406 of the module 400 are relatively thick conductors and are spaced farther apart from one another. Notwithstanding this, the SPD module 400 can be installed to and removed from the housing 452 of the switch base 450 with plug-in connection and release with similar benefits. In other embodiments, the terminal blades may alternatively be wrapped around plastic pieces or may be sections of a conductor folded upon itself like the terminals 760 shown in FIG. 16.

A slightly different arrangement of links is shown that actuates the micro-switch 250 for remote indication purposes is shown in the switch base 450, but the operation of the linkage is similar in that a rotational actuator 454 is provided between a linear actuator 456 and the micro-switch 250 to translate a linear path of movement of the actuator 456 to another axis perpendicular to the linear path for actuation of the micro-switch 250.

Figure 19:
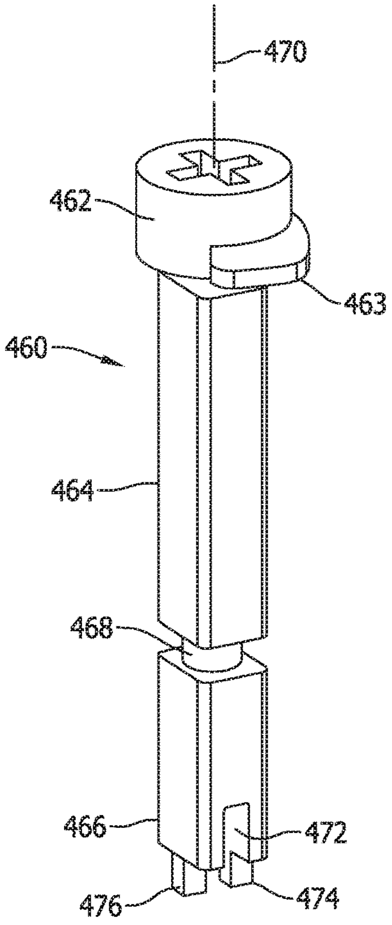
FIG. 19 is a perspective view of a rotary switch actuator for the exemplary switch mechanism in the SPD switch base shown in FIG. 18.
Figure 20:
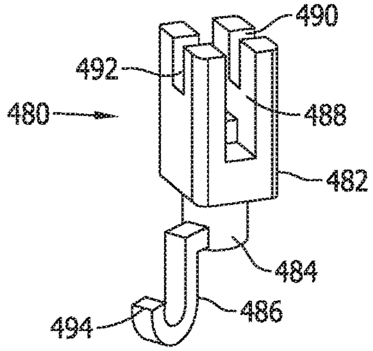
FIG. 20 is a perspective of a contact sleeve element for the exemplary switch mechanism in the SPD switch base shown in FIG. 18.
Figure 21:
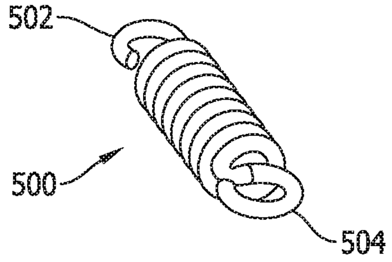
FIG. 21 is a perspective view of an exemplary bias element for the exemplary switch mechanism in the SPD switch base shown in FIG. 18.
Figure 22:
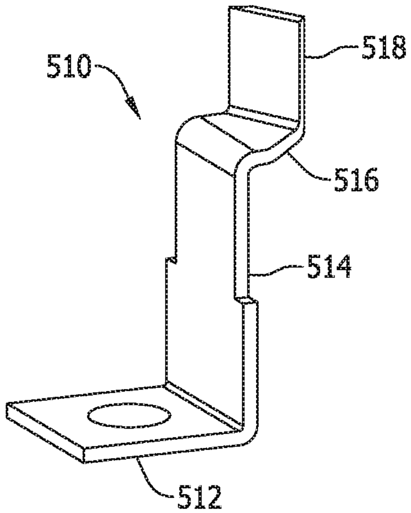
FIG. 22 is a perspective of a first exemplary terminal member for the exemplary switch mechanism in the SPD switch base shown in FIG. 18.
Figure 23:
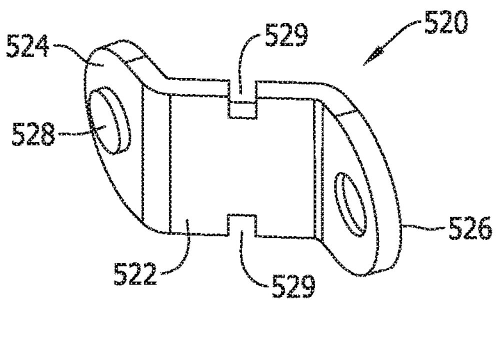
FIG. 23 is a perspective view of an exemplary dual switch contact element for the exemplary switch mechanism in the SPD switch base shown in FIG. 18.
Figure 24:
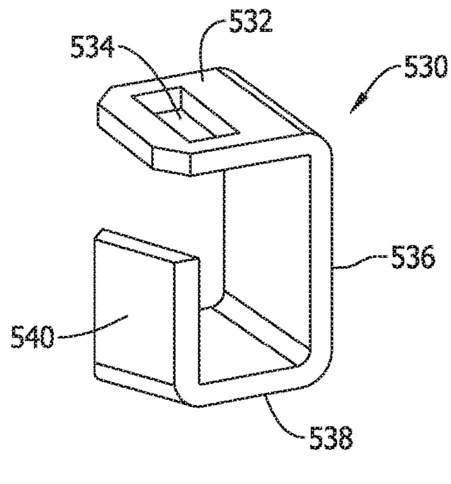
FIG. 24 is a perspective of a first exemplary terminal member for the exemplary switch mechanism in the SPD switch base shown in FIG. 18.

The SPD switch base 450 includes a different switch mechanism in the switch housing 452 than the switch mechanism in the switch base 150 described above. The switch mechanism includes a rotational switch actuator 460 (shown separately in FIG. 19), a contact sleeve 480 (shown separately in FIG. 20) attached to the rotational switch actuator 460, a bias element 500 (shown separately in FIG. 21) acting upon the contact sleeve 480, a first terminal element 510 (shown separately in FIG. 22), a dual contact arrangement 520 (shown separately in FIG. 23) in the contact sleeve 480, and a second terminal 530 (shown separately in FIG. 22). Unlike the embodiments described above including contacts displaced along a liner axis and linear path of motion, the arrangement shown provides for a rotational displacement of the switch contacts to connect or disconnect the terminals The rotational switch actuator 460 includes an engagement head 462 and a radial interlock element 463 formed therewith, an elongated and generally rectangular shaft 464 extending beneath the head 462 and a coupler 466 at the end of the shaft 464 opposite the head 462. The shaft 464 includes a circular section 468 that facilitates rotational mounting of the switch actuator in the switch base housing 452. The head 462 in the example shown includes a cross-shaped recess that may be engaged with a tool such as a Philips head screwdriver to rotate the head 462 about a longitudinal axis 470 of the actuator 460. The rotation of the head 462 about this axis, in turn, causes rotation of the shaft 464 and the coupler end 466. The coupler end 466 includes a contact slot 472 and projecting fingers 474, 476 for mating with the contact sleeve 480.

The contact sleeve 480 in the example shown includes a coupler section 482, a round cylindrical section 484 and an extension member 486 depending from the cylindrical section 484. The coupler section 482 is generally rectangular and is formed with a contact slot 488 and engagement slots 490, 492 that receive the respective fingers 474, 476 of the coupler end 466 of the switch actuator 460. A positive, interlocking relation is established between the fingers 474, 476 and slots 490, 492 such that when the actuator 460 is rotated about the axis 470 the contact sleeve 480 rotates also about the axis 470. The cylindrical section 484 may be fitted with the housing 452 to facilitate the rotation, and the extension member 486 depends from the cylindrical section 484 in a direction parallel to the axis 470 and its distal end defines a hook portion 494 that may be coupled to the bias element 500.

The bias element 500 in the example shown is a coil spring that is coupled to the switch housing 452 at one end 502 and to the hook portion 494 of the contact sleeve 480 on the other end 504. In different embodiments, the bias element 500 can be loaded in tension or compression to bias the contact sleeve 480 rotationally to a desired position. Absent engagement of the switch actuator head 462, the bias element 500 maintains the contact sleeve 480 and the switch actuator 460 to which it is connected in a position that corresponds to a closed or ON position of the switch mechanism or an opened or OFF position of the switch mechanism as further described below.

The first terminal 510 in the example shown is generally formed as a panel mount clip including a planar panel mount section 512 for connection to a panelboard with a known fastener, an extension section 514 extending perpendicular to the panel mount section 512, an angled section 516 extending from the extension section 514 and extending in a spaced apart but parallel relation the panel mount section 512, and a contact plate 518 extending upwardly from the angled section 516 and also extending obliquely to the panel mount section 512 and the extension section 514.

The contact arrangement 520 includes a generally planar center section 522, a first contact section 524 extending obliquely and away from the center section 522 if a first direction, and a second contact section 526 extending obliquely away from the center section 522 in a second direction opposite to the first direction. The contact sections 524, 526 include an integrally formed raised contact 528 extending outwardly from each section 524, 526 for engagement with the respective terminal members 510, 530. The center section 522 includes recesses or slots 529 that receive mating features in the coupler 466 of the actuator 460 and the contact sleeve 480 when assembled. The center section 522 fits in the slots 472, 488 of the coupler end 466 and the contact sleeve 480.

The second terminal element 530 includes a generally flat and planar module contact section 532 including an opening 534 to receive the terminal blade 404 of the module 400, an extension section 536 extending parallel to the module contact section 532, an arm section 538 extending perpendicular to the extension section 536 and parallel to the module contact section 534, and a contact plate 540 extending upwardly from the arms section 538 and also extending obliquely to the extension section 536.

Figure 25:
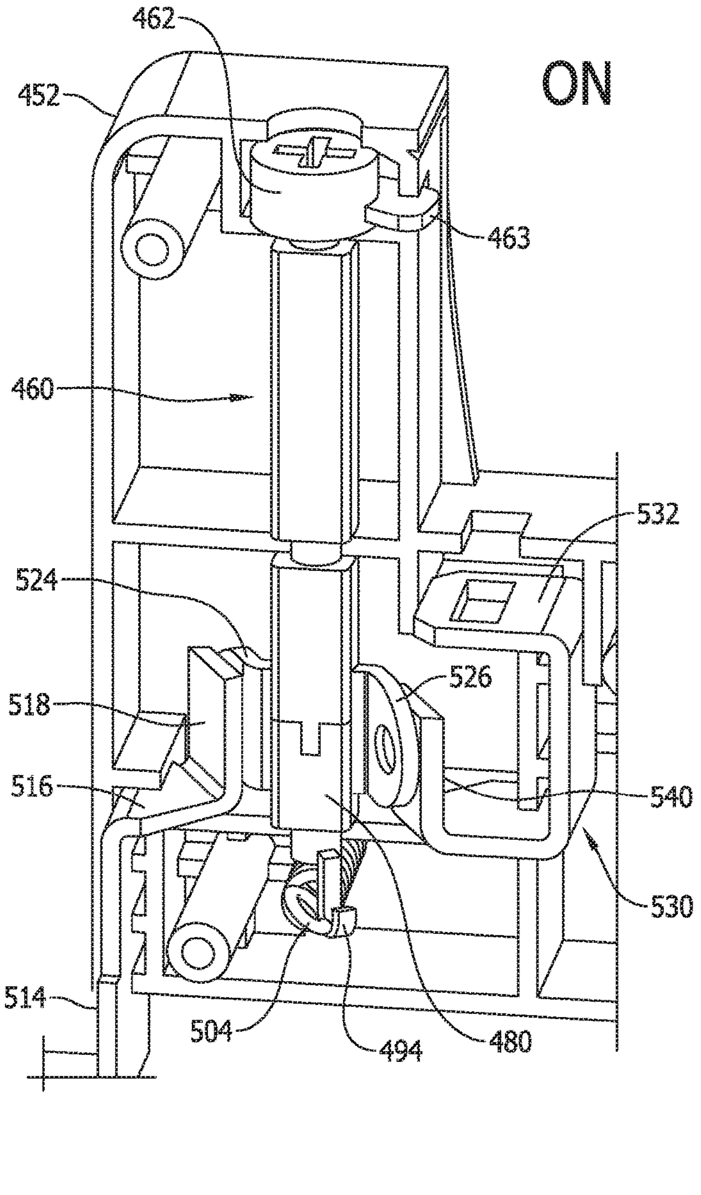
FIG. 25 a partial perspective view of the SPD switch base shown in FIG. 18 and illustrating its internal switch mechanism in an ON position.

FIG. 25 illustrates the switch mechanism in the ON position wherein the contact sections 524, 526 of the contact element 520 are in contact with the oblique sections 518, 540 of the terminals 510, 530. The interlock element 463 of the actuator head 462 projects into the SPD module receptacle and engages an opening in the lateral side of the SPD module 400 to effectively lock the module 400 to the switch base housing 452. Also, if one attempts to install the module 400 with the switch in the ON position, the interlock element 463 will interfere with the housing of the module 400 and prevent its installation.

Figure 26:
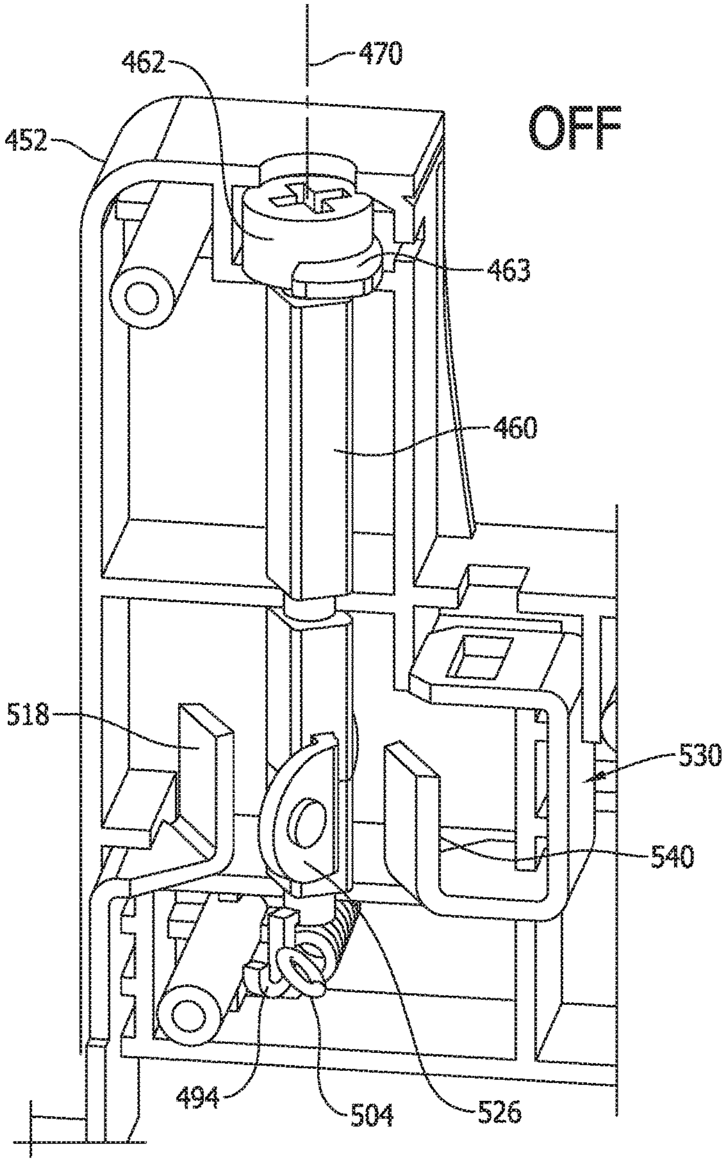
FIG. 26 a partial perspective view of the SPD switch base shown in FIG. 18 and illustrating its internal switch mechanism in an OFF position.

FIG. 26 illustrates the switch mechanism in the OFF position wherein the contacts are rotated about the axis 470 to become separated from the oblique sections 518, 540 of the terminals 510, 530. The contacts may be rotated between the ON and OFF positions by rotating the actuator 460, and specifically the actuator head 462 with a Philips head screwdriver. When so rotated, the interlock element 463 of the actuator head 462 is rotated away from the SPD module receptacle and no longer projects into the SPD module receptacle. As such, the interlock element 463 disengages from the opening in the lateral side of the SPD module 400 to effectively unlock the module 400 from the switch base housing 452. The SPD module 400 may be unplugged from the switch base when the switch mechanism is in the OFF position, and the module 400 or a replacement module may be freely installed with the switch mechanism in the OFF position.

The end 504 of the bias element 500 attached to the hook portion 494 of the contact sleeve 480 may apply a biasing force to the hook portion 494 and the contact sleeve 480 to assume one or other of the OFF or ON positions of the mechanism as desired. For example, in the example shown the bias element spring 500 may be a tension spring that biases the mechanism to the ON position, and when one attempts to rotate the switch actuator 460 to move the mechanism to the OFF position one must overcome the bias of the spring 500 in order to open the switch mechanism. Of course, an opposite directed bias is possible.

The exemplary switch mechanism and the specific components thereof as shown and described in FIGS. 18-26 are exemplary only. Variations of the components illustrated are contemplated and may be adopted in other embodiments. For example, the actuator head may be configured for use with other types or tools than a Philips head screwdriver, and in some embodiments the switch actuator need not be engaged by a tool at all but instead could be gripped and actuated with a person's fingers. Likewise, various different shapes and arrangements of the contacts, contact sleeve, contact arrangement, and other types of bias elements may be utilized with similar effect to provide switch mechanisms with comparable function.

Figure 27:
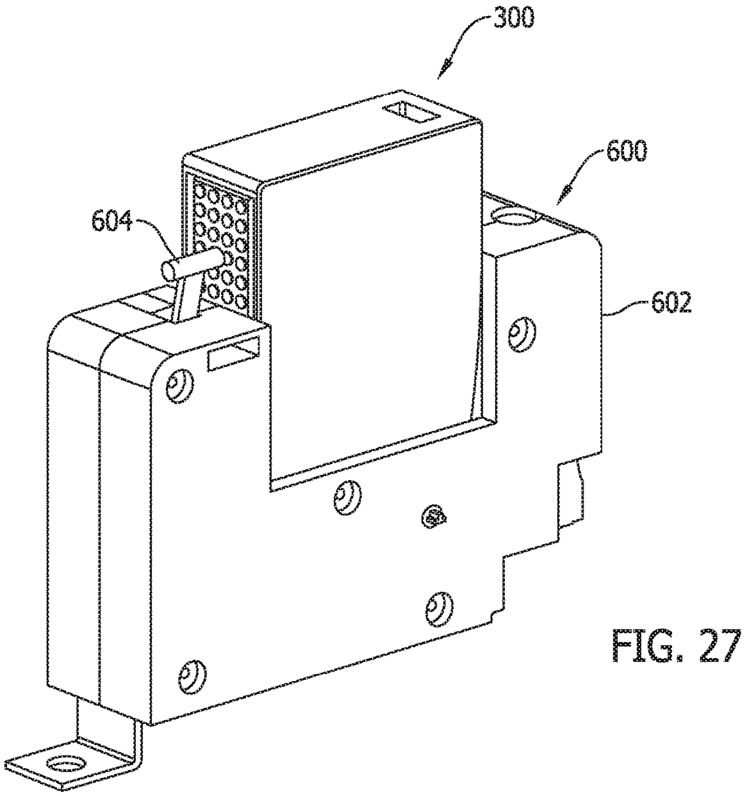
FIG. 27 is a perspective view of another embodiment of an SPD module inserted into another embodiment of a panel mount SPD switch base.
Figure 28:
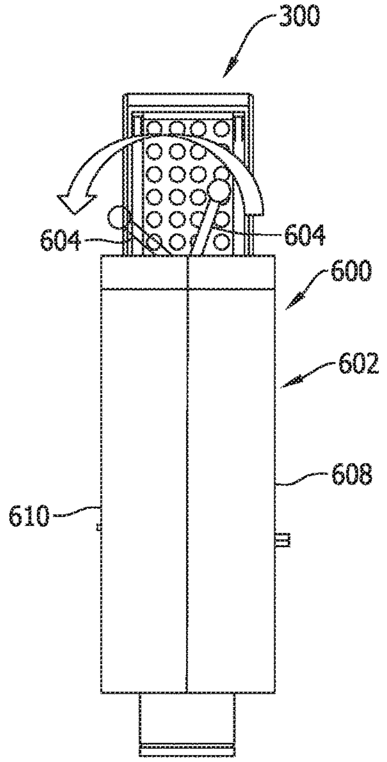
FIG. 28 is a side elevational view of the device shown in FIG. 27 and illustrating operation of the switch actuator.
Figure 29:
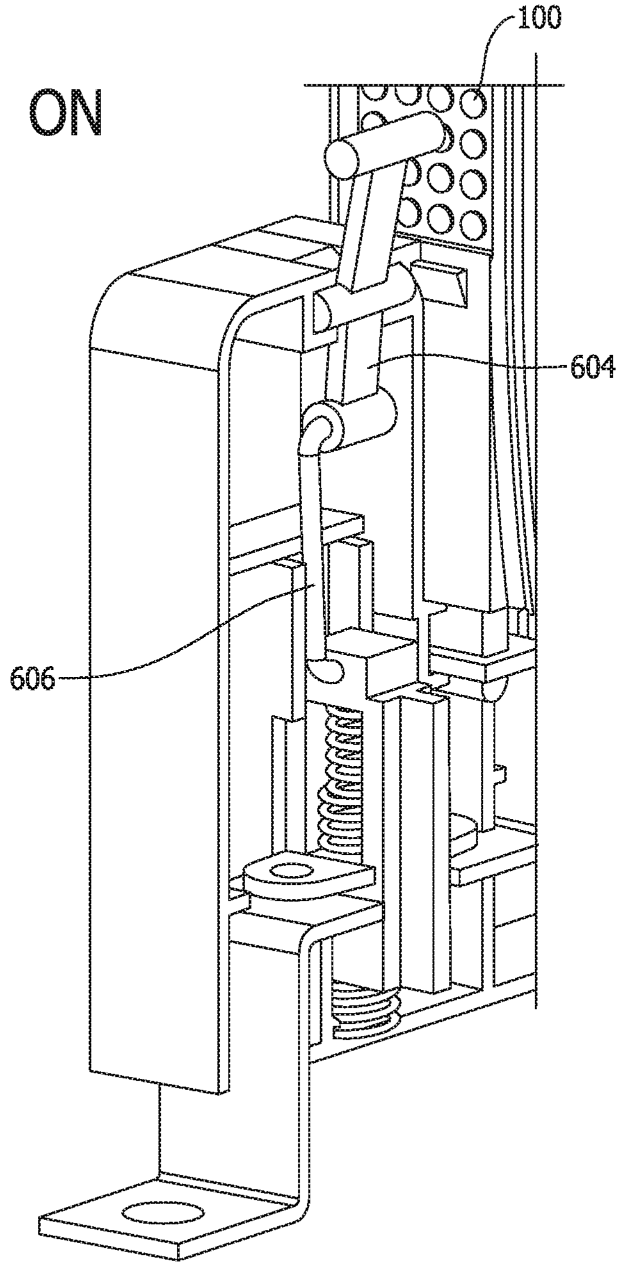
FIG. 29 a partial perspective view of the SPD switch base shown in FIG. 27 and illustrating its internal switch mechanism in an ON position.
Figure 30:
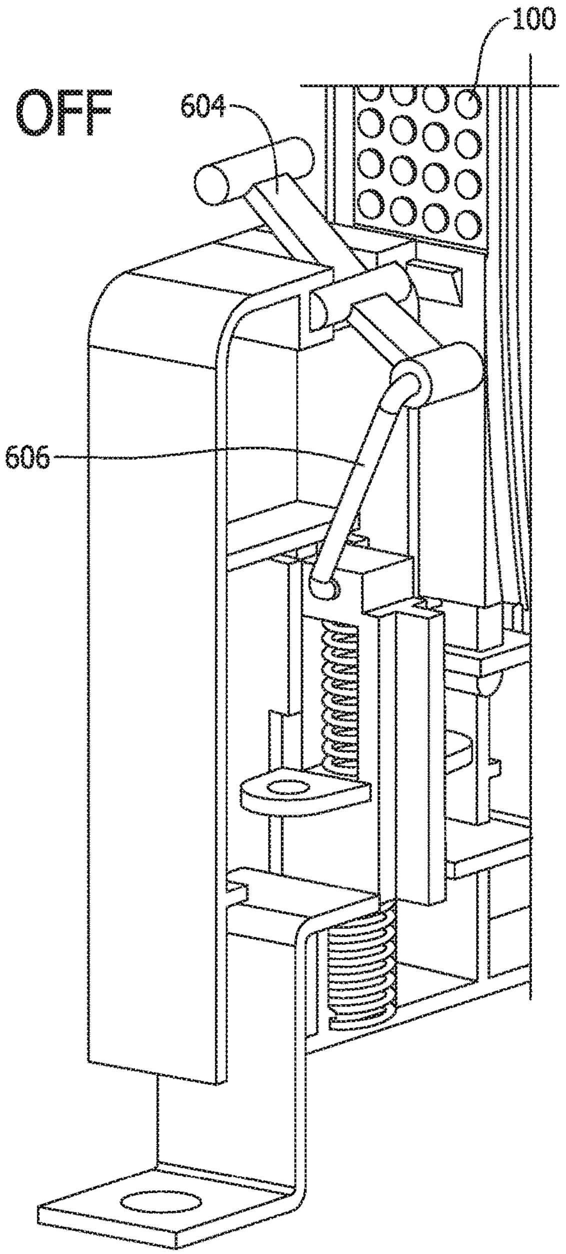
FIG. 30 a partial perspective view of the SPD switch base shown in FIG. 27 and illustrating its internal switch mechanism in an OFF position.

FIG. 27 is a perspective view of the SPD module 300 inserted into another embodiment of a panel mount SPD switch base 600 including still another switch mechanism that is illustrated in FIGS. 28-30. The switch mechanism in the SPD switch base 600 is similar to the switch mechanism shown and described in the SPD switch base 150 except that the switch actuator 190 and the link 192 is replaced with a switch actuator 604 and link 606. The switch actuator 190 is pivotally mounted in the switch housing 602 and is rotatable about an axis that extends parallel to the longitudinal sides of the switch housing 602, whereas the switch actuator 190 is rotatable about an axis extending parallel to the longitudinal sides of the switch base housing 152.

The switch actuator 604 in the example extends from the switch base housing 602 as a lever that is movable side-to-side as best shown in FIG. 28. The actuator 604 is movable by rotating a T-shaped handle bar in the illustrated embodiment between a first position (FIG. 29) wherein the actuator 604 projects from the upper side of the switch base housing 602 and the handle rests at an inclined angle extending toward the first longitudinal side 608 of the switch housing 602 while the portion of the actuator 604 within the housing is inclined and extends toward to the opposite longitudinal side 610 of the switch housing base 602. The link 606 is coupled to the end of the actuator 604 inside the housing 602 and when the actuator 604 is rotated to the first position the link 606 causes the dual switch contacts to assume the closed or ON position.

The handle and actuator 604 may be rotated in the opposite direction as shown in FIG. 30 wherein the actuator 604 projects from the upper side of the switch base housing 602 and the handle rests at an inclined angle extending toward the second longitudinal side 610 of the switch housing 602 while the portion of the actuator 604 within the housing is inclined and extends toward to the opposite longitudinal side 608 of the switch housing base 602. The link 606 is coupled to the end of the actuator 604 inside the housing 602 and causes the dual switch contacts to assume the opened or OFF position shown in FIG. 30. The link 606 accordingly lifts the switch contacts from the connecting terminals or pushes the switch contacts against the connecting terminals along a linear path of motion depending on which direction the actuator 604 is rotated.

The exemplary switch mechanism and the specific components thereof as shown and described in FIGS. 27-30 are exemplary only. Variations of the components illustrated are contemplated and may be adopted in other embodiments. For example, the T-shaped handle bar in the actuator 604 may be considered optional in some embodiments and may be omitted or replaced by another gripping structure for the benefit of a user. Likewise, various different shapes and arrangements of the actuator and linkage may be alternatively utilized with similar effect to provide switch mechanisms with comparable function.

Figure 31:
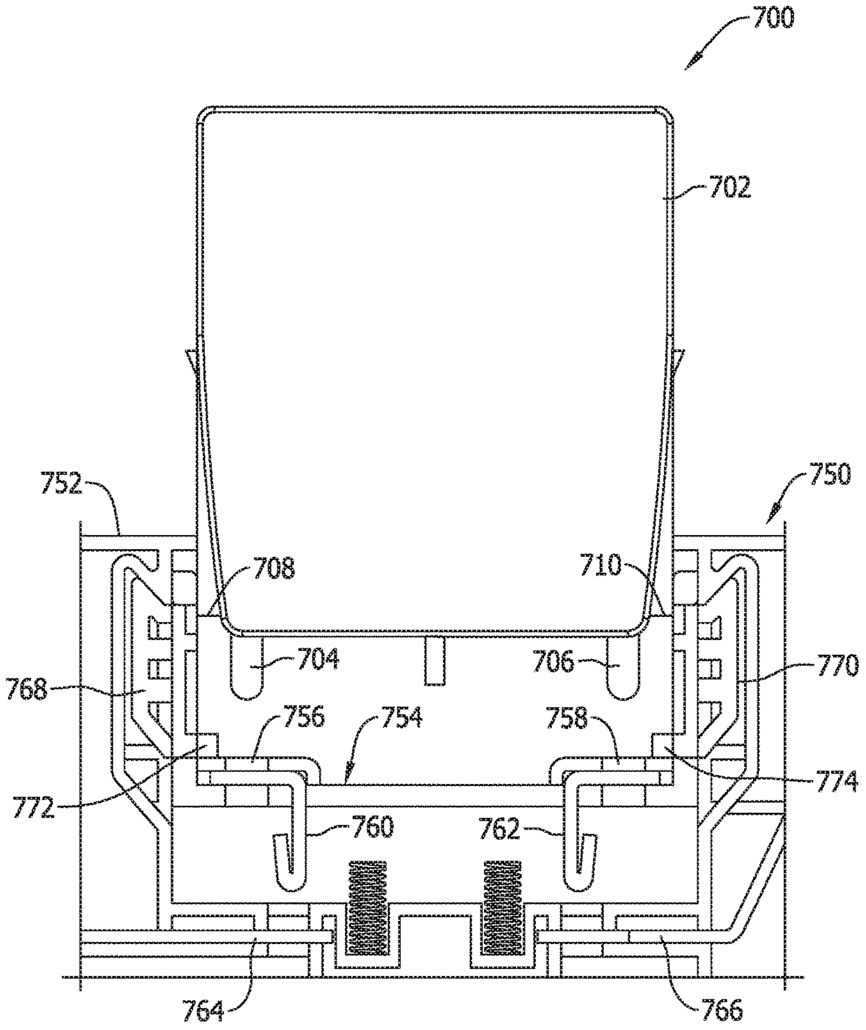
FIG. 31 is a perspective view of another embodiment of an SPD module being inserted into another embodiment of a panel mount SPD switch base in a first stage of installation.

FIG. 31 is a partial perspective view of another embodiment of an SPD module 700 being inserted into another embodiment of a panel mount SPD switch base 750 in a first stage of installation. In this embodiment, the switch base 750 includes a movable carriage 754 in the switch housing 752. The carriage 754 is fabricated from a non-conductive material and includes first and second terminal openings 756, 758 that receive the terminal blade elements 704, 706 that extend from the SPD module housing 702. The carriage further includes contacts 760, 762 that may be received in terminal openings in the terminal members 764, 766 of the switch housing base 750. In the stage shown in FIG. 31, the carriage 754 and its depending contacts 760, 762 are spaced from the terminals 764 and 766 and the carriage is in an OFF position wherein the terminals 764 and 766 are disconnected from one another. The SPD module 702 is shown partly inserted into the switch base receptacle, and the terminal blades 704, 706 have yet to reach the carriage 754. Movable locking elements 768, 770 are shown in FIG. 31 on the opposing side edges of the receptacle, and module has yet to engage either one of the locking elements 768, 770 either.

Figure 32:
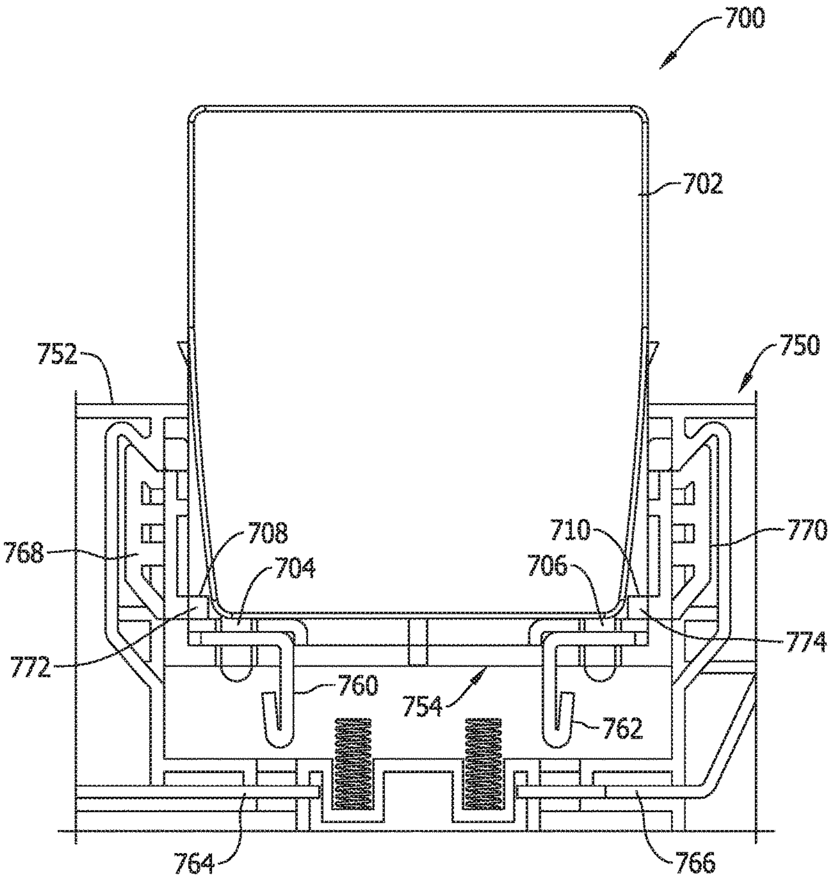
FIG. 32 is a perspective view of the SPD module and SPD switch base of FIG. 31 in a second stage of installation.

FIG. 32 shows a second stage of installation of the SPD module 700 wherein the module housing 702 is further descended in the switch receptacle and the terminal blades 704 and 706 are now received in the openings 756, 758 (FIG. 31) in the carriage 754. The carriage 754 has yet to move in this stage. Flanges 708, 710 provided on the lateral sides of the SPD module housing 700 now engage arms 772, 774 that extend slightly into the receptacle in the switch housing 752. The arms 772, 774 prevent further downward motion of the module until the locking elements 768, 770 are engaged to an aperture in the module housing similar to the opening 120 shown in FIG. 1.

Figure 33:
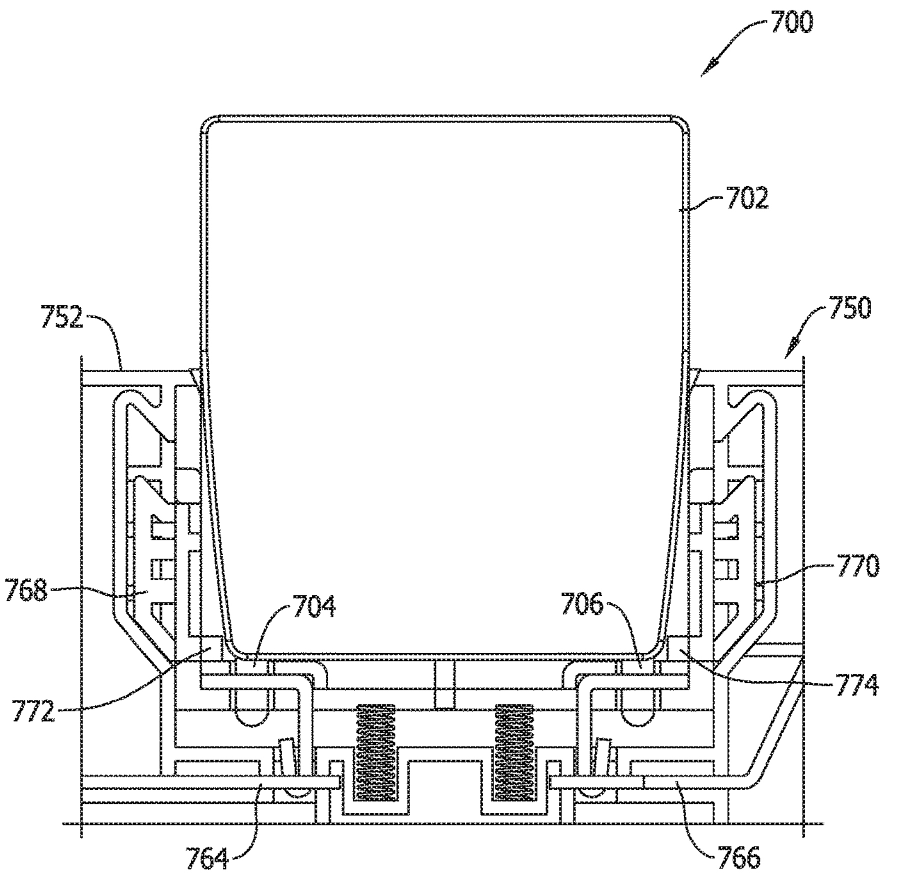
FIG. 33 is a perspective view of the SPD module and SPD switch base of FIG. 31 in a third stage of installation.

FIG. 33 shows a third stage of installation of the SPD module 700. The module housing 702 is further descended in the switch receptacle and the carriage 754 moves with it. The carriage contacts 760, 762 are now being received in the terminal elements 764, 766. The locking elements 768, 770 are also moving as the modules 702 descends in this stage.

Figure 34:
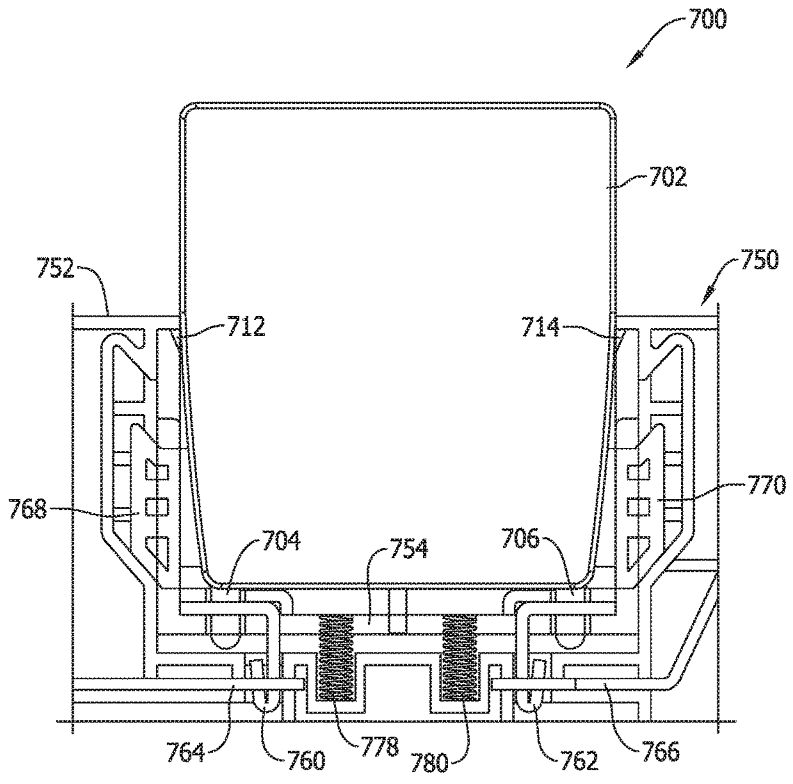
FIG. 34 is a perspective view of the SPD module and SPD switch base of FIG. 31 in a fourth stage of installation.

FIG. 34 shows a fourth stage of installation of the SPD module 700. The module housing 702 is now completely descended in the switch receptacle and the carriage 754 carriage contacts 760, 762 are now fully received and engaged in the terminal elements 764, 766. The locking elements 768, 770 are also fully descended and assume a locked position in the switch housing 752 to hold and maintain the carriage 754 in place. The terminal elements 764 and 766 are now connected to the terminal blades 704, 706 of the module 700 via the carriage 754. Locking tabs 712, 714 on the sides of the module housing 702 may engage locking ledges in the upper portion of the fuse receptacle to provide further assurance of the SPD module 700 being mechanically retained in the ON position shown in FIG. 34.

To release the SPD module 700 from the switch base 750, one may press down on the module housing 752 to slightly descend the module 700, the carriage 754 and the locking elements 768, 770 further in the switch base. As this occurs, the locking elements 768, 770 become released, as well as the locking tabs 712, 714 of the SPD module housing 702 become mechanically released. Once released, bias elements 778, 780 supply an upwardly directed force to cause the module 700, the carriage 754 and locking elements to ascend in the receptacle. As this happens the stages shown in FIGS. 31-33 happen in reverse and the SPD module 700 may be simply and easily removed and replaced by a user. In another embodiment, the module 700 may instead be manually grasped and pulled upwardly to cause the carriage 754 and locking elements to ascend in the receptacle rather than being moved by bias elements.

By virtue of the carriage 754 and the locking elements 768, 770 the act of installing the SPD module 700 accomplishes a switching function to connect the terminals 764, 766. The bias elements 778, 780 further provide an ejection feature in combination with the carriage 754 and the locking elements 768, 770 that simply and easily provides a push-to-release mechanism for a user to remove the module 700. In some embodiments, the locking elements 768, 770 may also provide bias force to prevent the contacts 760, 762 from mating with the terminals 764, 766 prior to mating of the terminal blades 704, 706 with the terminal openings 756, 758 in the carriage 754.

The benefits and advantages of the invention are now believed to have been amply illustrated in relation to the exemplary embodiments disclosed.

An embodiment of a surge protection device has been disclosed including a surge protection module having a nonconductive housing, first and second terminal blades extending from the nonconductive housing, and a varistor element connected to one of the first and second terminal blades inside the housing. The surge protection device also includes a switch base separately provided from the surge protection module, the switch base including a receptacle configured to receive at least a portion of the nonconductive housing, first and second terminal elements establishing electrical connection to the terminal blades via plug-in connection, and dual switch contacts selectively positionable between an opened position and a closed position to disconnect or connect the first and second terminal elements.

Optionally, one of the first and second terminal elements may be a panel mount clip. The switch base may include a remote indication assembly for communicating with a remote device. The surge protection module may include a mechanical element in the surge protection module that is responsive to an overvoltage condition to move from a first position to a second position, and the switch base may include a first mechanical link engageable with the mechanical element and movable along a linear axis. The surge protection device may also include a second mechanical link engageable with the first mechanical link, the second link being rotatably mounted in the switch base. A micro-switch may be located in the switch base and may be engageable by the second mechanical link.

As further options, the nonconductive housing of the surge protection module may include an interlock aperture, and the switch base may include an interlock element movable toward and away from the interlock aperture when the surge protection module is received in the switch base. The dual contacts may be movable along a linear axis in the switch base between the opened and closed positions. The switch base may include a push button actuator causing the dual contacts to move. The dual set of switch contacts may be held open in a primed condition until engaged by the pushbutton actuator. The switch base may include a rotatable switch actuator. The rotatable switch actuator may be rotatable about an axis parallel to a lateral side of the switch base. Alternatively, the rotatable switch actuator may be rotatable about an axis parallel to a longitudinal side of the switch base. The rotatable switch actuator may extend as a lever projecting from the switch base, the switch base having opposed lateral sides and opposed longitudinal sides, the lever being selectively positionable between a first inclined position extending toward one of the opposed longitudinal sides a second inclined position extending toward the other one of the opposed longitudinal sides. The lever may include a T-shaped handle bar.

As still further options, the switch base may further include a movable conductive carriage including depending contact elements establishing electrical connection with the first and second terminal blades and with the first and second terminal elements. The nonconductive housing of the surge protection module may include an integrally formed finger grip. The terminal blades of the surge protection module may extend in respectively spaced apart and generally parallel planes. The nonconductive housing of the surge protection module may include a plurality of side surfaces, and the terminal blades of the surge protection module may extend from the same one of the side surfaces of the surge protection module. The dual switch contacts may be rotatably moved between the opened and closed positions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A surge protection device comprising:

a surge protection module comprising a nonconductive housing including a plurality of side surfaces, first and second terminal blades extending from the nonconductive housing from the same one of the plurality of side surfaces, and a varistor element connected to one of the first and second terminal blades inside the nonconductive housing; and a switch base separately provided from the surge protection module, the switch base comprising a receptacle configured to receive at least a portion of the nonconductive housing of the surge protection module, first and second terminal elements establishing electrical connection to the terminal blades of the surge protection module via plug-in connection, and dual switch contacts selectively positionable between an opened position and a closed position to disconnect or connect the first and second terminal elements.

2. The surge protection device of claim 1, wherein one of the first and second terminal elements is a panel mount clip.

3. The surge protection device of claim 1, wherein the switch base includes a remote indication assembly for communicating with a remote device.

4. The surge protection device of claim 1, wherein the surge protection module includes a mechanical element in the nonconductive housing that is responsive to an overvoltage condition to move from a first position to a second position, and the switch base comprising a first mechanical link engageable with the mechanical element and movable along a linear axis.

5. The surge protection device of claim 4, further comprising a second mechanical link engageable with the first mechanical link, the second link being rotatably mounted in the switch base.

6. The surge protection device of claim 5, further comprising a micro-switch in the switch base and engageable by the second mechanical link.

7. The surge protection device of claim 1, wherein the nonconductive housing of the surge protection module includes an interlock aperture, and wherein the switch base includes an interlock element movable toward and away from the interlock aperture when the surge protection module is received in the switch base.

8. The surge protection device of claim 1, wherein the dual switch contacts are movable along a linear axis in the switch base between the opened and closed positions.

9. The surge protection device of claim 8, wherein the switch base includes a push button actuator causing the dual switch contacts to move.

10. The surge protection device of claim 8, wherein the dual switch contacts are held open in a primed condition until engaged by the pushbutton actuator.

11. The surge protection device of claim 8, wherein the switch base includes a rotatable switch actuator.

12. The surge protection device of claim 11, wherein the rotatable switch actuator is rotatable about an axis parallel to a lateral side of the switch base.

13. The surge protection device of claim 11, wherein the rotatable switch actuator is rotatable about an axis parallel to a longitudinal side of the switch base.

14. The surge protection device of claim 13, wherein the rotatable switch actuator extends as a lever projecting from the switch base, the switch base having opposed lateral sides and opposed longitudinal sides, the lever being selectively positionable between a first inclined position extending toward one of the opposed longitudinal sides and a second inclined position extending toward the other one of the opposed longitudinal sides.

15. The surge protection device of claim 14, wherein the lever includes a T-shaped handle bar.

16. The surge protection device of claim 1, wherein the switch base further comprises a movable conductive carriage including depending contact elements establishing electrical connection with the first and second terminal blades and with the first and second terminal elements.

17. The surge protection device of claim 1, wherein the nonconductive housing of the surge protection module includes an integrally formed finger grip.

18. The surge protection device of claim 1, wherein the terminal blades of the surge protection module extend in respectively spaced apart and generally parallel planes.

19. The surge protection device of claim 1, wherein the dual switch contacts are rotatably moved between the opened and closed positions.

* * * * *